(12) United States Patent
Bravo et al.

(10) Patent No.: US 12,688,502 B2
(45) Date of Patent: Jul. 21, 2026

(54) METHOD FOR MANAGING DATA AND STORING THEM IN BLOCKCHAIN

(71) Applicant: MYLIME S.R.L., Bologna (IT)

(72) Inventors: Luca Bravo, Bologna (IT); Antonio Molinari, Bologna (IT); Alfredo Reboa, Bologna (IT)

(73) Assignee: MYLIME S.R.L., Bologna (IT)

( * ) Notice: Subject to any disclaimer, the term of this patent is extended or adjusted under 35 U.S.C. 154(b) by 741 days.

(21) Appl. No.: 17/623,179

(22) PCT Filed: Jun. 25, 2020

(86) PCT No.: PCT/IB2020/056018
§ 371 (c)(1),
(2) Date: Dec. 27, 2021

(87) PCT Pub. No.: WO2020/261173
PCT Pub. Date: Dec. 30, 2020

(65) Prior Publication Data
US 2022/0360457 A1 Nov. 10, 2022

(30) Foreign Application Priority Data

Jun. 28, 2019 (IT) ........................ 102019000010443
Dec. 30, 2019 (IT) ........................ 102019000025777

(51) Int. Cl.
*G06Q 20/40* (2012.01)
*H04L 9/00* (2022.01)
(52) U.S. Cl.
CPC ............. *G06Q 20/401* (2013.01); *H04L 9/50* (2022.05); *G06Q 2220/00* (2013.01)

(58) Field of Classification Search
CPC ..... H04L 9/50; G06Q 20/401; G06Q 2220/00
USPC ........................................................ 705/75
See application file for complete search history.

(56) References Cited

U.S. PATENT DOCUMENTS

| | | | |
|---|---|---|---|
| 10,719,501 B1 * | 7/2020 | Leise ..................... | G06Q 40/00 |
| 2018/0018723 A1 * | 1/2018 | Nagla ................... | H04L 63/102 |
| 2018/0139043 A1 | 5/2018 | Jayachandran et al. | |
| 2018/0167198 A1 * | 6/2018 | Muller ................... | G06F 21/44 |
| 2018/0211213 A1 * | 7/2018 | Vivier ................... | H04L 9/3239 |
| 2019/0013934 A1 | 1/2019 | Mercuri et al. | |
| 2019/0028277 A1 * | 1/2019 | Jayachandran ....... | H04L 9/3247 |
| 2019/0034923 A1 | 1/2019 | Greco et al. | |
| 2019/0158270 A1 | 5/2019 | Berti | |
| 2019/0220861 A1 * | 7/2019 | Silver ................... | H04L 9/3239 |

(Continued)

*Primary Examiner* — Courtney P Jones
(74) *Attorney, Agent, or Firm* — McGlew and Tuttle, P.C.

(57) ABSTRACT

Described herein is a method for associating information with an asset, comprising the following steps: •acquiring a unique identifying code associated with the asset; •transmitting to a digital platform a request for storing the information about the asset; • through the digital platform, verifying whether storing the information in blockchain requires the consent of at least one authorized participant; • through the digital platform, sending to the at least one authorized participant a request for consent to store the information; • when the consent of the at least one authorized participant is received by the digital platform, through said digital platform storing in the blockchain an information block containing the combination of the information about the asset with the unique identifying code of the asset.

19 Claims, 10 Drawing Sheets

(56) References Cited

U.S. PATENT DOCUMENTS

| 2019/0279204 A1* | 9/2019 | Norton | .................... | G06Q 10/08 |
| 2019/0317935 A1* | 10/2019 | Berti | ...................... | G06F 16/27 |
| 2020/0059363 A1* | 2/2020 | Lobo | ........................ | G07G 3/00 |
| 2020/0119905 A1* | 4/2020 | Revankar | ............... | G06Q 20/06 |
| 2020/0159890 A1 | 5/2020 | Chui et al. | | |
| 2020/0219093 A1* | 7/2020 | Malhotra | ............. | G06Q 20/389 |
| 2020/0265442 A1* | 8/2020 | Parker | ................... | G06Q 20/40 |
| 2020/0312048 A1* | 10/2020 | Goluguri | ................ | H04W 4/40 |
| 2020/0322413 A1* | 10/2020 | Saraf | ..................... | H04L 67/289 |
| 2023/0063172 A1* | 3/2023 | Liberman | ............ | G06Q 20/389 |

* cited by examiner

METHOD FOR MANAGING DATA AND STORING THEM IN BLOCKCHAIN

TECHNICAL FIELD

The present invention relates to the sector of tracking tangible assets and managing data relating thereto through the use of blockchain technology.

BACKGROUND ART

It is usual to accompany tangible assets, in particular luxury or high value assets, with certificates of authenticity that should guarantee the purchaser with regard to the origin and genuineness of the asset. In case of limited series, the serial number and the total number of the production lot are also provided. Typically, certificates of authenticity are for example used in the sector of top-range watches and other luxury assets, as well as, for example, in the market of works of art.

The certificates currently in use are not effective because they do not guarantee the genuineness of the asset, its origin and its traceability. They are easily falsifiable and, not being associated with the asset itself, but often simply applied in the form of codes on a paper certificates, they can be tampered with, replaced or combined with different assets from the original one.

Many complex assets, for example motorcycles, automobiles, photographic cameras, weapons, watches and the like, can be subject to maintenance and repair operations. The latter may be due to the need to repair an accidental damage, for example in the case of motor cars the damage caused by an accident, or in case of small objects (telephones, watches) the damage consequent to an accidental fall. Repairs or extraordinary maintenance also include other interventions, such as the replacement of a component that is defective, or mounted incorrectly during the production phase. The value of a complex asset (i.e. one comprising multiple parts) of this kind may be severely undermined if maintenance or repair interventions are carried out not according to best working practices, but by unauthorized personnel and/or using non-original spare parts. Controlling the authenticity of spare parts and/or the correct performance of any intervention on the asset is a critical aspect for the purposes of maintaining its value over time.

Today, there are no digital or physical instruments that efficiently guarantee, for example, to a subsequent purchaser that the asset being purchased has been subjected correctly and legitimately to all periodic checks prescribed and provided by the manufacturer and/or has been subjected to maintenance and/or repair operations solely with the use of spare parts or materials that were original or otherwise certified for example by the manufacturer and performed by qualified personnel.

Nor are there methods and systems allowing a purchaser to ascertain the lawful origin of the asset. This is true both in case of first purchase of a new asset, and a fortiori in case of re-purchase of an asset by an individual or a company, for example a lease or rental company. For example, it is extremely difficult for someone purchasing a watch or another luxury asset, for example through a dealer, directly from an individual, or at an auction house, to be certain both of the lawful origin of the asset, and of its history, i.e. the sequence of events or operations to which the asset has been subjected. Essentially, today there are no available instruments that allow an efficient and secure traceability of the asset.

US2018/0167198 discloses a system for decentralized tracking of assets for a distribution chain that provides a system for the automatic management of stocks. The system disclosed in this prior document is specifically dedicated to the distribution of electronic devices and related software. Transactions pertaining to the electronic device or the hardware are recorded in a blockchain. The purpose of the disclosed system is to prevent illegal transfers of hardware or software to the grey market or the black market. Moreover, this prior art system allows to provide the technical support staff with information about the chain of ownership transfers and other data related to the life of the product.

US2019/0034923 discloses a system and a method of confidential secure custodial transfers of assets between entities utilizing transaction agents implemented via a blockchain.

US2019/0158270 discloses a system for generating, tracking and recording a digital representation of an asset, utilizing a blockchain.

These known systems have multiple limits.

In general, today there is no centralized register or a platform that creates a univocal digital ecosystem for managing the information of the product or asset starting from the production chain until reaching the sale network, in which are recorded for example information about a specific asset, defined univocally by recording some or all of its components of the bill of materials, so as to describe its history in order to preserve its value over time and to guarantee its origin and genuineness, for example in case of successive transfers of ownership of the asset.

Therefore, there is a need to provide a method that allows to overcome completely or partly the limits of the current systems for certifying and guaranteeing the origin, the genuineness and other aspects that affect the value of a tangible asset, i.e. of a physical asset.

SUMMARY

Very briefly, to overcome or alleviate one or more of the drawbacks and of the limits of the current art, a method is provided for associating information with a tangible asset, which method comprises a step of acquiring a unique identifying code associated with the asset and of combining an information about the asset with the unique identifying code of the asset so as to form a digital information block, which is stored in a blockchain.

Blockchain storage can be subordinated to the consent, by at least one authorized participant, hereafter also indicated as "authorized user", registered on a digital platform. If consent is given, a step of storing the information block in the blockchain is carried out. As will be clarified below with reference to some exemplary embodiments, all information is not necessarily stored in a blockchain. In some cases, information may be stored in a different database. It is also possible to store in the blockchain only a piece of information adapted to verify the genuineness of a file stored in a different database. For example, it is possible to store in the blockchain the hash of a video, audio, image, text or other kind of file, which is physically stored in a different database.

In the context of the description and of the accompanying claims, the term "asset" means a physical product built or assembled by humans with manual and/or industrial procedures, and that entailed a physical and/or chemical transformation of any raw material. The term "complex asset" means either an asset consisting of at least two assets or goods assembled together. In the present description and in the accompanying claims, unless otherwise indicated, the term "asset" also comprises a complex asset. In the present context, components, parts or assets constituting in turn elements inserted in a complex asset are sometimes designated as "sub-assets".

Typical complex assets are automobiles, motorcycles, scooters, bicycles, boats, or other vehicles, watches, photographic cameras, weapons, electronic devices, jewelry items. It should be understood that the above list is merely exemplifying and not limiting. Those skilled in the art will understand from the present description that the method and the technologies disclosed herein find general application to any asset.

In some embodiments, the unique identifying code can be applied to the asset in a removable manner. In other embodiments, the unique identifying code can be associated with the asset (or to a component thereof, i.e. a sub-asset) in a removable manner, so as to avoid any tampering and to guarantee that the unique identifying code remains combined with the asset. The unique identifying code can be applied in the form of a code readable by an electronic device, for example a barcode, a QR code, a code in OCR characters or another automatically recognizable character. However, in particularly advantageous embodiments, as will be described more in detail below, the code is stored in an electronic apparatus, typically for example an RFID tag. Some embodiments provide for the use of RFID tags or other electronic apparatuses of the passive type, i.e. that do not require their own electrical power supply, for example by means of a battery, but rather that are powered by means of energy transmitted through radio frequency by a reading device, which interfaces with the electronic apparatus to power it electrically and to read the content stored therein. These embodiments have the advantage of not requiring an autonomous power supply of the tag. In other embodiments, for example in the case of motor vehicles, motorcycles or other assets provided with their own energy source, an active tag may be utilized.

The digital information to be inserted into the blockchain can be for example validated by means of a smart contract. As will be described hereafter, there are multiple information items that in the course of the lifetime of an asset it may useful or advantageous to record in blockchain for different reasons.

The information concerning the asset may be or comprise data concerning at least one characteristic of at least one component (i.e. of at least one sub-asset) of the asset. For example, the information may comprise data able to track the supply chain of the asset and hence to identify the origin of one or more of the components thereof. Each component may in turn be distinguished by a unique identifying code, which can become a part of a block of information associable to the asset. The information may comprise one or more data concerning the owner of the asset and possibly persons who became in succession owners of the asset. In some embodiments, the data may contain an intervention carried out on the asset, for example repair, maintenance, replacement of components, upgrading, addition or the like.

The data concerning one or more ownership transfers of the asset may also be stored in the blockchain.

In some cases, it may be necessary or appropriate to replace the unique identifying code associated with the asset. In this case, this even can be stored in blockchain. The replacement may become necessary for several reasons, such as: failure of an electronic apparatus (tag or other) in which the unique identifying code is stored; loss of the support on which the unique identifying code is applied or stored; failure of the component in which or on which the unique identifying code is applied; reorganization of the digital platform with adoption of a different type of identifying code and/or support for its storage.

Data concerning events that involve the asset can also be stored. Other examples of data or information that can be stored in the blockchain will be mentioned hereafter and in the accompanying claims.

The method is thus implemented in a system of which the asset is an integral part, inasmuch as the unique identifying code is associated therewith, which is used for the creation of the information blocks to be inserted in blockchain.

As will be clarified hereafter with reference to application examples, the method can be implemented through a platform that makes APIs (Application Programming Interfaces) available and that can intercommunicate with a plurality of authorized participants. These can comprise in particular the owners of one or more assets, the manufacturer who produced or assembled the tangible asset and/or different business units connected with the same manufacturer, the suppliers of the manufacturer, the official dealers or those authorized by the manufacturer.

In the present context, the term "supplier" can mean in general any supplier of the related chain, also at different vertical levels, or the same suppliers in an integrated manner.

Dealers can comprise single or multi-brand dealers, workshops or laboratories authorized for repairs, maintenance or other interventions on the assets of a given manufacturer, etc.

In general, one or more of the authorized participants are required to provide consent for the recording an information block in a shared ledger based on blockchain technology. Typically, recording can take place by activating a smart-contract. Consent from different participants can be requested according to the type of information to be stored.

In general, the authorized participants, in particular the owners of an asset, are in possession of a device, for example a smartphone or another smart-device, a tablet or another mobile device, adapted to interact with a digital platform and with the asset, for example to acquire the unique identifying code from the latter, and to interact with the digital platform to upload, download or exchange information, which in some cases can become a part of a digital information block intended to be inserted in the blockchain. The authorized participants, typically the dealers, the manufacturer and the suppliers, can be in possession of a device for reading the information from the RFID tag or another electronic apparatus for storing the unique identifying code, and of a system for connecting, typically through the Internet, to the digital platform. The reading device may operate in the UHF band.

In some embodiments, a direct connection may be provided between multiple authorized participants, for example between a manufacturer and its suppliers at the first and subsequent levels.

Information blocks in time sequence, associated with a determined asset constitute the history of the asset and assure that the value of the asset is maintained or increased over time.

Thanks to the method and to the system described herein, it is possible to store in a shared ledger, based on blockchain technology, a chain of information blocks that become immutable and unalterable, thanks to the typical properties of the shared ledger. In general, a blockchain may contain blocks related to a plurality of assets owned by different persons. Thanks to the intrinsic nature of the blockchain, these data are unalterable.

From the blockchain it is possible to extract, for example, data related to a determined asset. These immutable and unalterable data are indicative of the events occurred to the asset, including for example the origin and the successive transfers of ownership, the maintenance, repair or periodic check operations, and so on. Any person interested for example in purchasing the asset, from the manufacturer or from the reseller, or from a third party who was its owner until that time, from an auction house or from another natural or legal person, can obtain information about the life of the asset by consulting the blockchain data, whose authenticity is guaranteed by the inviolability and unalterability of the blockchain itself.

The present invention also relates to a system comprising at least one unique identifying code associable to an asset and a digital platform, adapted to combine to said unique identifying code at least one information content related to the asset, with which the unique identifying code is associated, and to store said information content in a blockchain. The system may comprise one or more additional components, hereafter described with reference to non-limiting examples, to implement the method of the present invention.

BRIEF DESCRIPTION OF THE DRAWINGS

The invention will be better understood following the description and the accompanying drawings, which illustrate an exemplifying and non-limiting embodiment of the invention. More in particular, in the drawing the figures show.

DETAILED DESCRIPTION

Figure 1:
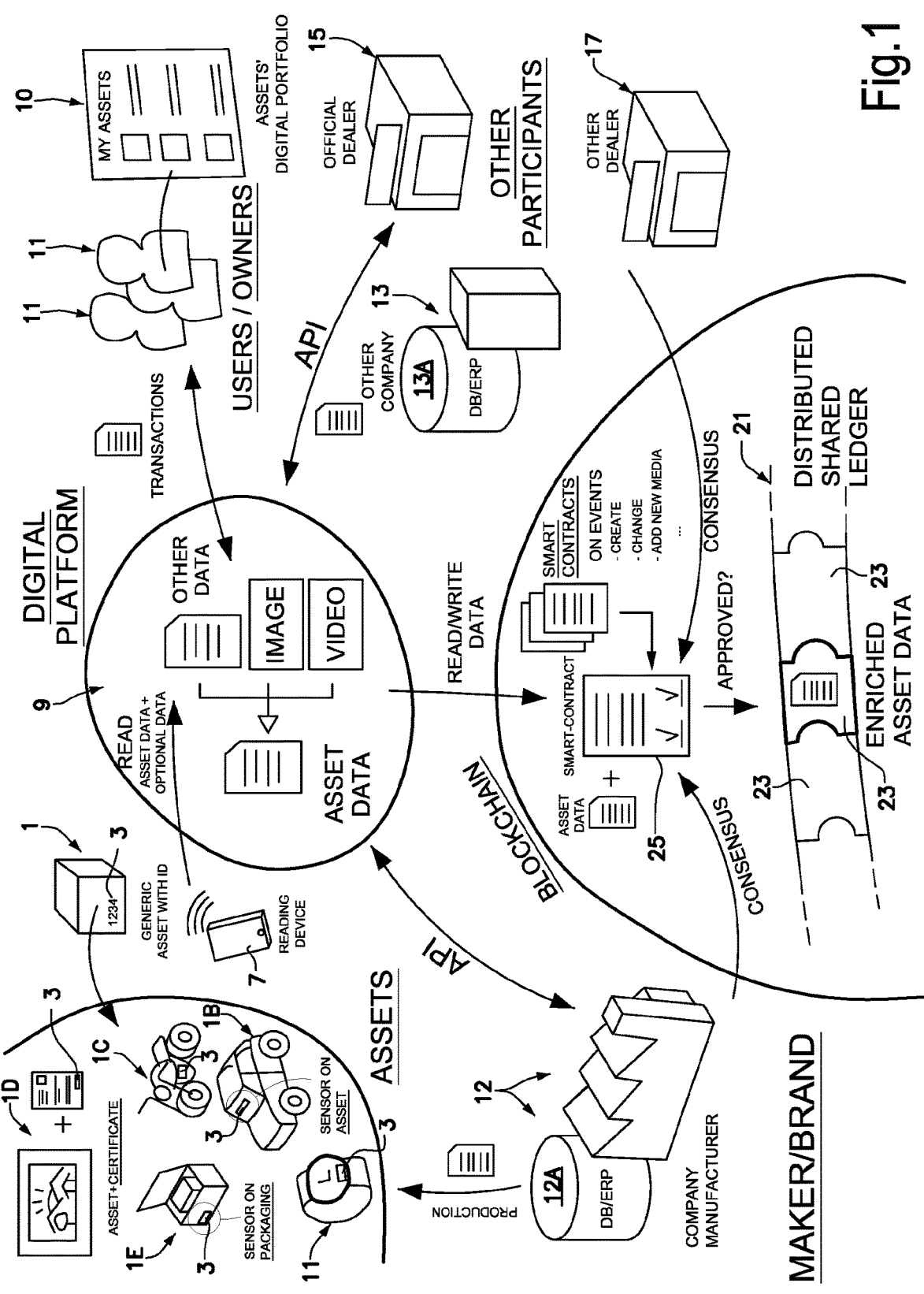
FIG. 1 a diagram of a system for the implementation of the method described herein.

FIG. 1 schematically represents the basic elements that define a system for implementing a method according to the present invention. As will be readily apparent from the description that follows, the system illustrated in FIG. 1 is referred in particular to an environment in which the assets are industrial products in the broadest sense (including artisanal products), of which it may be interesting to store in a blockchain data concerning the production phase, the utilization and/or post-sale events.

As will be understood from reading the following description, the method can also be applied to assets, both industrial and otherwise, which are already on the market and already have behind them a determined history, i.e. a sequence of events, i.e. it may also be employed in retrofitting operations.

It is possible to associate a unique identifying code with any asset, which has already left a production plant, or has been subjected to one or more transactions or ownership transfers. The unique identifying code will in this case be utilized to manage the information about said asset for its life following the time of association of the unique identifying code with the asset itself. Typically, this can take place in case of unique items (artistic works, antique furniture, manufactured items of various kinds) that are acquired by an auction house and sold at auctions. The auction house can associate the items with a unique identifying code, to be utilized to store in blockchain information concerning events relating to the item from the time it is received by the auction house to be auction onwards.

As described below, the system comprises a digital platform, with which authorized participants can interact and communicate, and with which data related to a plurality of tangible assets are managed. The authorized participants can be of various types and can be divided into categories, each of which has the authorization to interact with the digital platform in a different manner from the other categories; for example, different authorization levels may be provided for different categories of authorized participants.

Four macro-categories of participants can generally be identified. A first macro-category of authorized participants can comprise participants within a same company that produces the asset. In this case, the authorized participants comprise for example different business units operating in the same company. A second macro-category of authorized participants can comprise the manufacturer of the asset and the third-party suppliers of the manufacturer. A third macro-category can comprise dealers. A fourth macro-category can comprise the end customers, i.e. the ultimate owners of the asset 1.

With reference to the diagram of FIG. 1, reference numeral 1 indicates a generic asset characterized by a unique identifying code ID (labeled 3 in FIG. 1). References 1A, 1B, 1D, 1E indicate some examples of possible assets, non-exhaustively illustrative of typical complex assets that can be managed with the method described herein.

The assets 1A-1E exemplify assets of various natures in which the unique identifying code 3 is applied with different procedures, according to the nature of the asset. For example, reference 1A schematically indicates a watch, in which the unique identifying code 3 can be applied to the case. References 1B and 1C indicate vehicles, in which the unique identifying code can be stored for example in an electronic apparatus 3 incorporated in a component of the vehicle; reference 1D indicates an artistic work, for example a painting, in which case the unique identifying code can be incorporate in an electronic apparatus 3 (e.g. an electronic tag), applied on a certificate paired with the item 1D. The reference 1E indicates an asset provided with a packaging, in which the unique identifying code can be applied to or contained in the packaging.

As mentioned several times in the present context, the unique identifying code can be materialized in various ways, for example stored in a memory of an electronic apparatus, or printed, etched, glued or applied in any other way on the asset, on its packaging or on an external support. In the description, the reference numeral 3 will usually indicate indifferently the unique identifying code and/or the support, device, apparatus, or other material element, in which or on which the unique identifying code is applied. This is because the unique identifying code can for example also be simply etched on a portion that is a part of the asset, for example on the case of a watch, or it may be written (in digital or material form) on a support.

Hereafter, reference numeral 1 will indicate a generic asset unless otherwise specified.

In the illustrated embodiment, the unique identifying code can be stored in an electronic apparatus 3, for example of the passive type, i.e. it does not need its own electrical power supply, but rather it can be powered by means of an external reading or reading and writing electronic apparatus, which interacts with the electronic apparatus 3 to read and/or write information.

Preferably, the unique identifying code is stored in the electronic apparatus 3 in a non-rewritable manner.

In some embodiments the electronic apparatus 3, hereafter also called "sensor" or "tag", can be an RFID (Radio Frequency IDentification) tag or another electronic apparatus or passive tag. In FIG. 1 the electronic apparatus 3 is also indicated as "sensor".

More in general, the electronic apparatus 3 can be a transponder, whose content can be read by a reading device, and that makes available one or more memories for storing data, typically a unique identifying code, by means of a data writing or writing and reading device.

In some embodiments, the electronic apparatus 3 can be a multi-mode apparatus, for example dual mode, i.e. provided with two or more different antennas, for interaction with mutually different external reading/writing apparatuses. For example, the electronic apparatus or tag 3 can be able to interact with the surrounding environment, when interrogated by "VHF" industrial devices equipped with RFID technology and, alternatively, with a smartphone or another smart-device, or other portable devices, equipped with "UHF" or NFC technology.

Dual mode devices can be advantageous for example to allow the manufacturer or other authorized participants, for example a dealer, to interact remotely with the electronic apparatus 3, and to allow other categories of authorized participants, to interact with the electronic apparatus 3 with short-range devices, typically a smart-device, such as a smartphone or equivalent mobile device.

In some embodiments, the antenna or antennas, with which the electronic apparatus 3 is fitted, are connected to an integrated circuit (chip), able to save and/or write data, in digital format, with a level of computer security that can be scaled as needed. The integrated circuit performs all functions necessary for the operations of the electronic apparatus or tag 3, essentially: storing data associated with the tag 3, converting the radiofrequency (RF) energy received from the antenna into electrical power supply, the modulating functions of the reflection of the received energy necessary for transmitting data to an external reader apparatus. The data stored in the tag 3 can be just a unique identifying code of the tag 3. The unique identifying code can be inserted in the tag 3 by its manufacturer.

In some embodiments, it can be possible to store in the tag 3 also one or more items of data or information about the asset 1, with which the tag is associated, although this is not necessary. The association between the unique identifying code of the tag 3 and data and/or information about the asset 1 is carried out in a blockchain, with procedures that will appear clear from the description that follows. Briefly, in a blockchain will be stored, in the form of one or more information blocks, the unique identifying code of the electronic apparatus 3 and data or information pertaining to the asset 1, with which the electronic apparatus 3 is paired. It is therefore not necessary for the electronic apparatus 3 to contain data or information additional to those strictly necessary to uniquely identify the electronic apparatus 3 itself.

The memory of the chip may be read-only (RO), write-once, read-many (WORM), or read-write (RW). Various types of memory can coexist in the same integrated circuit.

The antenna or the antennas are electrically connected with the integrated circuit. The functions of the antenna consist of collecting the greatest possible quantity of RF energy irradiated by an external reader (to allow the tag 3 to be powered) and of reflecting a part thereof (to transmit). The performances of a passive tag 3 (operating range, control logic capacity) thus strongly depend on the ability of the antenna to collect energy and to reflect it.

For UHF frequencies, dipole antennas of various shapes and complexity can be used (as in most commercial radio receivers).

The integrated circuit and the antenna or antennas can be mounted on a substrate that provides physical support for the assembly of the tag 3 and the "glue" to keep its components together.

Use of a passive RFID tag or other electronic apparatus, preferably in the form of a passive tag, has the advantage (with respect (for example, to the use of a barcode, a QR, OCR or similar code) of providing a unique identifying code. Each tag manufacturer attributes an absolute unique code to each specimen of electronic apparatus produced.

In some embodiments, the electronic apparatus 3 can be applied to the asset, typically a complex asset, by the manufacturer of the asset 1. In other embodiments, the electronic apparatus 3 can be applied on a simple asset, constituting a component of a complex asset. For example, if the asset 1 is an automobile, the tag or other electronic apparatus 3 can be applied on a component or sub-asset of the automobile, typically on the chassis, on the engine crankcase, or on the windshield, on a component of the body or other part. The electronic apparatus 3 can be applied to said component or sub-asset of the complex asset by the supplier of the component.

In some embodiments, in the electronic apparatus 3 can be stored, in a mutually combined manner, further data in addition to the unique code of the electronic apparatus 3, which can be generated by its manufacturer.

Although this is not necessary for the purposes of the unique identification of the asset 1, in the electronic apparatus 3 other data concerning the asset 1 can be stored, in addition to the unique identifying code of the electronic apparatus 3. For example, in the electronic apparatus 3 a unique code assigned to the asset 1 by the manufacturer or by the reseller of the asset 1 can be written and stored. In this way in the memory of the electronic apparatus 3 the unique identifying code of the electronic apparatus 3 and a code assigned by the manufacturer to the specific asset 1, with which the electronic apparatus 3 is associated, will be stored.

In particular, in the case of complex assets, in the memory of the tag or other electronic apparatus 3 other useful data can be stored in the course of the life of the asset. These data can be different according to the type of asset 1 with which they are associated. By way of example, on the electronic apparatus 3 there can be stored: general data of the asset 1; maintenance data; additional security code, for example a public key for verification with respective private key; data of the manufacturer; custom data. These data, if stored in the apparatus 3, can be used independently of the connection to a platform through which other data and information about the asset 1 are collected and stored persistently in the blockchain.

However, in general, data and information about the asset 1 and events that involve it are stored in a blockchain. As will be readily apparent from the description that follows, entering these data and information in a shared ledger based on blockchain technology makes it possible to guarantee the authenticity of the asset 1 and it will allow its traceability of production and utilization, providing unalterable information for example on repairs, maintenance operations, ownership transfer, and other events to which the asset 1 will be subjected. In case of assets 1 that can be the subjects of rental agreements, such as automobiles or other means of transportation, data about customers who rent the asset may be collected. to allow a traceability of use.

Although in the present detailed description of exemplary embodiments, specific reference is made to an electronic apparatus 3, in which the unique identifying code of the asset 1 is stored, it should be understood that this is only a particularly advantageous exemplary embodiment. In general, the unique identifying code can be in the form of a barcode, a QR code, OCR characters or in another machine-readable form. It may be possible for the unique identifying code to be provided, on the asset directly or on an element separate from the asset 1, in a form that is not readable by a machine but rather, for example, as an alphanumeric code that an operator or a user can simply transcribe by typing on a keyboard, on a pad or on another interface with which to communicate the code to a digital system. These various alternative embodiments of the unique identifying code can generally be utilized in various situations and circumstances, independently of the type of asset 1.

Returning now to the diagram of FIG. 1, reference numeral 7 indicates a generic reading device (indicated also as "reading device" in FIG. 1), adapted to read information associated with the asset 1, in particular its unique identifying code.

The reading device 7 can be owned by a participant authorized by a digital platform 9, which forms the heart of the system schematically illustrated in FIG. 1. An authorized participant may be the owner of one or more asset. In FIG. 1, reference numeral 11 generically indicates users or utilizers (also indicated as "users" and "owners" in FIG. 1), for example owners of one or more assets 1, which represent a category of participants authorized by the digital platform 9. Each user 1 may own a variable number of assets, which form his/her portfolio 10.

The reading device 7 can be a device provided with Internet connection to the digital platform 9 through a mobile phone network. For example, the reading device 7 can be a smart device, for example a smartphone, a tablet, or another mobile device equipped with a SIM (Subscriber Identity Module) card for connection to a data network.

With the digital platform 9 other authorized participants can intercommunicate, generally natural or legal persons, who can have different roles in the method disclosed herein. Each authorized participant can access the digital platform 9 and use the services thereof through suitable hardware and software instruments.

In general and schematic terms, in the context of the example of FIG. 1, a participant authorized to access and to utilize the digital platform 9 can be a manufacturer (OEM: Original Equipment Manufacturer) of a generic asset 1. Just by way of example, a single manufacturer 12 is illustrated in FIG. 1, but it should be understood that the digital platform 9 can be used by any number of manufacturers, provided they are duly authorized to use the digital platform 9, i.e. recorded on the digital platform 9. Reference 12A indicates a set of hardware and software components that constitute, or support the ERP (Enterprise Resource Planning) or the management software that integrates all the relevant business processes of the manufacturer 12.

It should be understood that the manufacturer 12 can in turn comprise different business units and/or different manufacturing sites, even distant from each other, although in the illustrative diagram of FIG. 1 the manufacturer 12 is represented by a single component.

Reference numeral 13 indicates a generic second company constituting an additional authorized participant, which has access to the digital platform 9. For example, the company 13 can be a supplier (indicated in FIG. 1 as a generic company: "other company") of first level or of subsequent levels, i.e. a direct supplier of the manufacturer 12 or an indirect supplier, supplying components to a direct supplier of the manufacturer company 12. Reference 13B indicates the ERP system and related support hardware. As in the case of manufacturer 12, also for the suppliers the single participant 13 constitutes a mere graphic representation of the possibility of having a multiplicity of different suppliers.

The diagram of FIG. 1 further shows additional authorized participants 15 and 17 which hereafter will be generically referred to as "dealers". In the present context, "dealer" may mean in general any person authorized to perform one or more types of activities or operations on the assets 1. For example, this category of authorized participants includes representatives and authorized (mono- or multi-brand) distributors, who legitimately and with the consent of the manufacturer 12, sell the assets 1 of the manufacturer 12. This category of authorized participants also includes workshops or laboratories authorized by the manufacturer 12 to carry out selling operations, or assistance, repair, maintenance, testing operations for quality control or for the development and improvement of the product, etc.

The generic definition of "dealer" can also include a person authorized to utilize one or more assets 1, for example a leasing company, a rental company, etc. In the case of motor cars or other transportation means, it can be a firm that owns a fleet of transportation means that are rented out.

Dealers 15, 17 have access to the digital platform 9, to record events necessary for the traceability of the assets 1 in terms of utilization.

As in the case of the manufacturer 12, also in the case of the dealers FIG. 1 shows a limited number of authorized participants belonging to this category (the two dealers 15, 17), but it should be understood that this represents only an exemplifying illustration and that in practice the authorized dealers will be multiple for each manufacturer. For example, for an automotive manufacturer there will be multiple dealers and authorized workshops.

While in the case of users represented by natural persons (typically the users indicated with the reference 11 in FIG. 1), the device 7 is prevalently (but not necessarily) a smartphone or generic smart device, or other mobile device, in the case of a dealer or of a manufacturer or supplier (authorized participants 12, 13, 15, 17) the reading device 7 can be a remote reading device, for example a reading device that intercommunicates with the electronic apparatus 3 in UHF band. It is not excluded that a dealer may use a mobile device, for example a smart device, to read the data of an electronic apparatus 3.

A same authorized participant, for example manufacturer 12, can request the use of multiple reading devices 7, located in various positions in a plant or in multiple plants, of one or more different manufacturing sites.

Some types of asset 1 can traverse one or more manufacturing or assembly units, in a same plant, or in different plants, even far from each other, which may be interconnected to share and exchange information about the assets in the various manufacturing and/or assembly steps. In this case, it may be useful or necessary to be able to remotely read the content of an electronic apparatus 3, for example when the asset transits along an assembly line, through a test installation, in the passage from a plant or manufacturing unit to the other, etc.

Remote reading devices 7 can also be provided to dealers 15, 17, for example to a reseller, to an authorized maintenance company, to a rental or leasing company. These entities may need to read the unique code stored in the electronic apparatus 3 associated with the asset 1, for example to carry out maintenance, inspection, repair activities, etc., or to stipulate lease or rental agreements.

It is also possible for the same authorized participant, for example a dealer, to possess two or more reading devices 7, even mutually different from one another. For example, it is possible to equip multiple operators of a same authorized participant with their own mobile device (smartphone or the like). In combination with these mobile devices, the dealer can also be equipped with a remote reading system. Typically, in the case of a car service center, the dealer may be provided with a remote reading device 7 in the reception area.

Remote reading devices 7 can be interfaced with a computer, in turn connected or connectable, through a channel of any nature, possibly via Internet, to other computers or to one or more servers of the digital platform 9, to which the authorized participants access, or to one or more servers of other authorized participants.

Multiple reading devices 7 in a same corporate organization, for example situated in one or more manufacturing units of a manufacturer 12, can be mutually connected through a local area network, to which computers and/or servers of the manufacturer company can be connected.

Two or more authorized participants that contribute to the manufacture of an asset 1 can be connected, directly or through the digital platform 9, to exchange data related to an asset 1 and/or to components that are a part of that asset. A connection of this type can be useful, for example, between an OEM manufacturer and a supplier.

This allows an exchange of data related for example to individual components, i.e. sub-assets (or individual simple or complex assets) that are ultimately assembled into an asset 1 to be sold. The possibility of an exchange of data between OEM and suppliers allows a complete traceability of the supply chain.

In the exemplifying case of a manufacturer in the automotive sector, the manufacturer and its component suppliers (brakes set, windows, electrical actuators, cast components, lighting bodies, transmission members, audio systems, satellite navigators, seats, and other hardware components, but also software components, etc.) can exchange data useful for example to track each individual component, i.e. sub-asset, that forms the final complex asset (automobile, for example).

Similarly, there can be an exchange of data between a dealer authorize to perform repair and replacement operations, and one or more suppliers of original spare parts.

As will be readily apparent from the examples illustrated hereafter, the individual authorized participants 11, 12, 13, 15, 17 are registered on the digital platform 9, which makes available to the users or authorized participants a series of API to carry out a plurality of functions, some of which will be described more in detail hereafter.

In FIG. 1 the possible data flows are indicated with arrows, with which captions related to the type of data, which circulate between the various participants or entities represented in FIG. 1, are associated. For example: from the manufacturer 12 to the assets 1 production data ("production") are transferred, from the reading device 7 to the digital platform data related to the assets and/or other optional data transit; between the users 11 and the digital platform 9 data related to various types of transactions transit. For the definition of data blocks approved for insertion in blockchain, a flow of data is provided from the digital platform, and consent from one or more participants (e.g. the manufacturer 12, a generic participant 13, 15, 17). The double arrows also indicate the interconnection modes between different entities (manufacturer 12, participants 13, 15, 17) and the digital platform 9 through the use of API.

Authorized participants can have different profiles that allow access to different functions offered by the digital platform 9. In other words, not all functions offered by the digital platform 9 can be used by each authorized participant. Typically, access to functions pertaining to the activities performed by the manufacturers (12), by the suppliers (13), by the dealers (15, 17) is limited to these entities and they will not be accessible to the owners (11) of assets.

In general, each dealer 13, 15 can be authorized to carry out only some of a plurality of possible operations, or have access only to some of a plurality of functions, made available by the digital platform 9. For example, a dealer that performs the function of representative and reseller of a determined manufacturing company can access the functions, made available by the digital platform 9, which are related to selling or trading transactions. A dealer that carries out service, repair, maintenance activities and periodic tests on a determined category of asset 1, may have access to those functions and/or transactions made available by the digital platform 9, which are related to the aforesaid activities carried out by the dealer.

The main purpose of the activity carried out by the digital platform 9 and by the authorized participants is to create, a database of unalterable information for each asset 1 (1A, 1B, 1C, 1D, FIG. 1), using blockchain technology, which contribute to maintain or increase the value of the asset 1 from the step of placement into production to post-sale steps, including any ownership transfers subsequent to the first sale, as well as other events, to which the asset 1 can be subjected.

As mentioned above, the electronic apparatus 3 can be applied to the generic asset 1 by different entities and at different times of the life of the asset 1. For example, the electronic apparatus 3 can be applied to the asset 1 by the manufacturer 12 or by a supplier 13, as mentioned above. In other embodiments, the electronic apparatus 3 can be applied by a dealer 15, 17. This is particularly the case if an electronic apparatus 3 is applied to a component that has to be replaced. In this case, a workshop or authorized laboratory will replace the faulty or damaged component with another component fitted with a new electronic apparatus 3. The latter will be applied to the asset 1 during the replacement, i.e. the repair of the asset 1. In this case the new electronic apparatus 3 can be embedded into or applied directly to the replacement component by the supplier of the component (spare part). The authorized workshop (dealer 15 or 17) proceeds with the final application of the new electronic apparatus 3 on the asset 1 at the time of repair. This is also useful in view of a possible functionality warranty.

It is possible that a new electronic apparatus 3 may, vice versa, be applied to the spare component by the dealer instead of by the supplier.

In some embodiments, an asset or complex asset 1 may comprise multiple assemblies, elements, units, aggregates and sub-assemblies of simpler assets, each of which, or some of which, are provided with respective electronic apparatuses 3 and can constitute sub-assets of the complex asset. In this case, multiple electronic apparatuses can be applied on the same asset or tangible asset 1.

The electronic apparatus 3 can be applied externally to the asset or to a component thereof, or it can be integrated or inserted in that component. Unless otherwise specified, in the present context the terms "applied", "inserted", "integrated" or "associated" are to be understood in a general sense, as comprehensive of any operation able to bind the electronic apparatus 3 to the asset 1, preferably in a non-removable manner.

In other embodiments, the electronic apparatus 3 can be applied on the packaging of the asset 1 or on additional objects contained in the packaging.

In general, an electronic apparatus 3, able to contain a unique identifying code of the asset 1, is applied on at least one component, i.e. a sub-asset, present in the bill of materials of a complex asset 1 or of the related packaging. The unique identifying code of the asset can consist of the same unique identifying code of the electronic apparatus 3, for example a serial number thereof. It is not excluded that during the utilization of the electronic apparatus 3, in the memory available therein other digital data may be added, able to constitute the unique identifying code, or to be a part thereof.

For example, in a complex asset like a motor vehicle, the electronic apparatus 3 can be applied to, or inserted or incorporated in the windshield or other glass component, such as the rear window. In other embodiments, the electronic apparatus 3 can be applied, incorporated or inserted in a component made of metallic, polymeric, plastic or composite materials. In yet other embodiments, the electronic apparatus 3 can be applied, inserted or incorporated in the chassis of the vehicle.

In the case of a complex but smaller asset, consisting of a smaller number of materials, such as a watch, the electronic apparatus 3 can be applied, inserted or incorporated in the case, in the bezel, in the dial or in the crystal. In a photographic camera, the electronic apparatus 3 can equally be inserted, incorporated or applied to the case, in the optoelectronic sensor, or in other components integral with the case. Interchangeable lenses of the photographic camera can have each its own electronic apparatus 3 applied to, or incorporated or inserted in the lens, in any case in such a position as not to interfere with the functions of the asset, for example and in particular the function of collecting and focusing light beams.

In general, the electronic apparatus 3 must be applied, inserted or incorporated in the asset 1 in such a way as not to compromise its functionality or its technical or esthetic characteristics. The choice of the type of electronic apparatus 3 and of its placement take this need into account.

The configuration and/or the physical characteristics of the electronic apparatus 3 will be chosen appropriately according to the procedures for association, insertion or application to the asset 1. The physical characteristics and/or the configuration of the electronic apparatus 3 can also be chosen according to the step of the production cycle in which the electronic apparatus 3 is associated, inserted or applied to the asset 1.

In some cases, one or more additional electronic apparatuses 3 can be associated, inserted or incorporated in sub-assemblies, parts, components or elements (sub-assets in general) of a complex asset, for example when these sub-assemblies, parts or elements (i.e. sub-assets) are subject to possible relatively frequent replacement operations.

In other embodiments, one or more sub-assemblies, parts or elements (i.e. subassets) of a complex asset 1 can be provided with unique identifying codes applied in the form of numerical codes, barcodes, QR codes, ORC character codes, or others, for the purposes clarified hereafter.

A first operation that can be carried out on the asset 1 is the preliminary pairing between asset 1 and unique identifying code. The dealer (reseller) 15 or 17, or the manufacturer 12 may apply a specific electronic apparatus 3 to a specific asset 1. In some embodiments, the electronic apparatus 3 can be applied on a component of the asset by the supplier of the component, as indicated above.

The electronic apparatus 3 can be provided for example by the manager of the digital platform 9 to the authorized participant who will then have to apply it on the asset 1 or on a component thereof. Each electronic apparatus 3 can be previously registered ("enrollment" operation) on the digital platform 9 through its own identifying code inserted, i.e. stored, by the manufacturer of the electronic apparatus 3.

In some embodiments, the unique code of the asset 1 can be stored in the electronic apparatus 3 and forms, together with the unique identifying code of the electronic apparatus 3, a unique identifying code of the asset 1. However, this is not necessary. The pairing between asset 1 (or its identifying code, for example the serial number thereof) and electronic apparatus 3 (i.e. the unique identifying code of the electronic apparatus 3) may take place at the level of the digital platform 9.

For example, the manufacturer 12 communicates to the digital platform 9 the serial number of the asset 1 and the unique identifying code stored within the electronic apparatus 3 that was associated to that asset 1. The digital platform 9 records this pairing or association. The digital platform 9 is thus in possession of the information necessary and sufficient for the unique and punctual identification of the asset 1.

When, for any reason, the electronic apparatus 3 has to be replaced, in the digital platform 9 the event related to the replacement is recorded, and the unique identifying code of a new electronic apparatus 3 is associated to the identifying code of the asset.

Having associated, at the level of the digital platform 9, to each asset 1 a unique identifying code that allows to uniquely identify the asset, multiple operations for managing the information associated or associable with a determined asset 1 can be executed through the digital platform 9. It is also possible to store information related to a determined asset in a shared ledger based on blockchain technology so that the information and their concatenation or time sequence cannot be altered or manipulated. The blockchain can be stored in a server of the digital platform 9. In some embodiments, the blockchain can also be stored by other authorized participants that constitute as many trusted nodes.

As will be readily apparent hereafter, the blockchain may collected a time sequence of information related to events that involve the asset 1 and that define the entire history of the asset 1.

Hereafter some possible operations, which can be carried out on data associated or associable to the generic asset 1, will be illustrated.

In the first place, through the described structure a purchaser, for example one of the users indicated with the reference numeral 11 in FIG. 1, can be associates with a given asset 1.

A user desiring to purchase an asset 1, for example an automobile, may go to a dealer 15, 17 and stipulate a purchase agreement. The dealer 15, 17 will issue the purchase order for the asset 1 requesting that it be placed in production at the production site 12.

In turn, the manufacturer 12 (OEM) will take care to launch the order for the materials necessary for the production of the asset 1 to the supplier 13 to subsequently proceed with the final assembly of the asset 1.

A unique identifying code must be associated with the asset 1 for which the order was issued. As indicated above, this unique identifying code typically is (or contains) the unique identifying code of an electronic apparatus 3 that is assigned to the asset 1.

In some embodiments, the digital platform 9 can provide an electronic apparatus 3, already enrolled on the digital platform 9 itself, to one of the authorized participants, so that the electronic apparatus 3 is associated with the asset 1 to be manufactured.

In some possible embodiment, the electronic apparatus 3 can be provided to one of the suppliers 13 of the manufacturer (OEM) 12. In this case the electronic apparatus 3 can be associated with, or incorporated in, a component that the supplier 13 sends to the manufacturer 12 and that the manufacturer 12 will insert as a component of the asset 1.

In the example of the automotive sector, to which reference has been made several times above, the electronic apparatuses 3 enrolled on the digital platform 9 can for example be supplied to the manufacturer of the windshield or of another component of the car, which then will supply said component with the electronic apparatus associated therewith.

In other embodiments, the supplier 13 can purchase the electronic apparatuses 3 from the manufacturer thereof and enroll them on the digital platform 9 when it uses them, for example inserting them in the components it supplies to the manufacturer 12.

In still other embodiments, the manufacturer 12 can obtain from the digital platform 9 the necessary electronic apparatuses 3, already enrolled on the digital platform 9, or it can purchase the electronic apparatuses 3 from the respective manufacturer and enroll them on the digital platform 9.

The electronic apparatus 3 can be applied, preferably in a non-removable manner, in a component of the complex asset, for example (in the case of a car) inside the windshield. The manufacturer can, through a reading and writing device adapted to interact with the electronic apparatus 3, read and store in its own database the unique code of the electronic apparatus 3 and pair it with the asset 1.

In other embodiments, it is possible for the unique code of the electronic apparatus 3 not to be used and for only the code assigned to the asset 1 by the manufacturer to be used, for example the serial number or the vehicle identification number, which in this case can be stored in the electronic apparatus 3. What matters is solely the uniqueness of the utilized code. Once a given unique identifying code is associated with an asset 1, said identifying code cannot be associated to other assets.

The digital platform 9 is provided with the information related to the asset 1 manufactured or being manufactured, and the unique identifying code thereof stored in the electronic apparatus 3. In this way the digital platform 9 is put in the conditions of identifying the asset 1 in a unique and punctual manner, and to keep track thereof, making the asset 1 itself involved in the activities regulated by the digital platform 9.

More specifically, the asset 1 becomes involved in the activities regulated through smart contracts defined in or by the digital platform 9. Smart contracts are automatic procedures, whose execution is requested by one or more authorized participants from the digital platform 9, who give consent to the execution of the smart contract. Smart contracts give rise to information blocks that are inserted in a blockchain, stored in a shared ledger, which guarantees the immutability of the data stored in the time sequence consisting of the information blocks forming the blockchain.

Different authorized participants can have different authorizations, i.e. they can be authorized by the digital platform 9 to carry out different activities, for example to activate different types of smart contracts. In general, individual participants are authorized to insert in the blockchain information blocks containing information adapted to maintain or increase the value of the asset 1 over time.

As mentioned, authorized participants (with various access modes and authorization level) can be: the manufacturer of the asset, the suppliers authorized by the manufacturer 12, authorized or official single- or multi-brand dealers, the owners of the assets. Authorized dealers, as mentioned above, can be distributors tasked with selling the asset, for example a dealer of automobiles, motorcycles, watches, photographic cameras, weapons or other assets 1, but also authorized or official workshops or laboratories, which can perform maintenance, repair, inspection and periodic checking operations, lease or rental companies etc.

The structure described with reference to FIG. 1 allows to have a complete traceability of an asset 1 and to store in a blockchain all the information related to the individual components (herein also indicated as sub-assets) that constitute the asset 1 itself, or at least to some of them. This is allowed by the fact that both the manufacturer 12, and the suppliers (represented schematically by the authorized participant 13 in FIG. 1) can provide information related to the components or sub-assets constituting the asset 1.

In principle, as has been observed above, each component or assembly (i.e. in general a sub-asset) which becomes a part of a complex asset 1 can in turn be identified by a unique identifying code. This code can be stored in an electronic apparatus 3, or it can consist of a barcode, a QR code or another machine-readable code. In some cases, the unique identifying code of a component can be applied on the packaging of that component.

The OEM manufacturer (authorized participant 12 in FIG. 1) can read and store the unique identifying codes of some or all components, i.e. sub-assets that become a part of the complex asset 1 to be assembled and sold. All these data can be stored for example on a server of the manufacturer. Information is thus stored that allows to identify each component of the complete asset 1, which will then be sold by the manufacturer 12. All information can be associated with a single asset 1, to which they refer, by pairing to the unique identifying code stored in the electronic apparatus 3 associated with the asset 1.

In addition to keeping memory of all the components (sub-assets) of the asset 1 (or at least of the main ones), the manufacturer 12 can also store other information about the manufacturing, logistics, engineering, quality control phases, etc. All information is paired to the unique identifying code of the asset 1.

The manufacturer 12 can also store data and information about the sale of the asset and about events following its sale (after-sales).

The information can be transmitted to the digital platform 9 to form one or more information blocks stored in a blockchain, schematically indicated with the numeral 21 in FIG. 1. Reference numeral 23 indicates individual information blocks that, mutually concatenated, constitute the blockchain 21.

It is not necessary for the above mentioned information to be stored in the blockchain 21. It is possible to store the information in one or more files that remain on the server of the manufacturer 12, or on another appropriate hardware resource. A digest or hash of these files can be created, which constitutes the digital information element required to be stored and to persist in blockchain.

In some embodiments, the information associated with the asset 1 and/or with its specific components (sub-assets) may also include data related to tests performed on the component or on the asset, or information about the procedures for the manufacture, assembly, testing or other operations carried out on the asset or one or more of its components, to document and certify their characteristics.

This information can also be stored in the form of multimedia files, such as image, audio or video files.

Image files can for example be used to certify the physical characteristics and the quality of a component or assembly of the asset 1. This functionality can be important for several authorized participants. For example, it may be useful for the supplier of a given component, which must meet particular quality criteria, to be able to certify the quality of the supplied component. This can be certified by means of multimedia files, which can contain simply images of the component, or also video showing tests, trials or checks actually carried out on that given component. This information guarantees the supplier with respect to the manufacturer, and the manufacturer with respect to the purchaser of the asset. In case of complaints about the quality of a component, for example following its accidental failure, the manufacturer of the asset and/or the supplier can be able to show that at the origin the component was free of defects and had passed any checks and tests that may have been prescribed as a condition for the supply.

In practice, the supplier can provide a referenced self-certification through multimedia files, with which the supplier 13 can unequivocally certify the procedure with which it delivers the component to the manufacturer 12. Similar considerations apply for the manufacturer 12 with respect to the end customer 11.

To guarantee complete traceability of the asset 1 and of the components thereof, the manufacturer 12 can store the aforementioned information on its own server (included in the hardware and software structure generically indicated with the reference 12A in FIG. 1). The information can then be passed to the digital platform 9, associating it with the unique identifying code of the asset 1 utilizing the APIs of the digital platform 9, as schematically indicated by the flow represented in FIG. 1.

The digital platform 9 can, through a smart contract, create an information block. The information block, with the consent of the manufacturer 12 and possibly of other authorized participants, whose consent is required for this type of operation, is stored in the blockchain 21.

The blockchain 21 can be stored in a server of the digital platform 9.

The individual authorized participants who cooperate with the manufacturer 12 can constitute nodes, in possession of computer resources adapted to store a copy of the blockchain. These authorized participants can be, in addition to the manufacturer 12 itself, the direct or indirect suppliers thereof (participants 13 in FIG. 1), the dealers (15, 17), possibly including lease or rental companies. Authorized participants can also be other partners of the manufacturer

12, for example a university institution that collaborates with the manufacturer 12 (or with a supplier 13 thereof).

As mentioned above, also for the purpose of reducing the quantity of information that must persist in the blockchain 21, it is possible to save and preserve files of larger size, typically multimedia files, on a server of one of the authorized participants, typically of the manufacturer 12 or of the supplier 13 of the individual component to which the file are referred. Digests or hashes of these files are stored in a blockchain. The integrity of the files stored outside the blockchain is guaranteed by their hashes or digests which in turn are unalterable thanks to the persistence in blockchains.

In some embodiments, the digital platform 9 can be managed directly by the manufacturer 12. In other embodiments, as shown schematically in FIG. 1, the digital platform 9 constitutes a third party with respect to the authorized participants, including the manufacturer 12. The digital platform 9 can represent a supplier of the manufacturer 12 or of one of the suppliers 13 thereof.

During the production of a determined asset 1, a first information block about the asset can be stored through a smart contract in the blockchain 21, which block can comprise, in short: a unique identifying code of the electronic apparatus 3 associated with the asset 1, an identifying number of the asset, for example a vehicle identification number or a serial number, an identifying code of the owner 11 and an identifying code of the dealer 15 or 17 who sold the asset to the purchaser.

In this way, information that unalterably and immutably ties the asset to a unique identifying code (contained in the electronic apparatus 3 paired with the asset 1) and to its owner persists in the blockchain 21

The user 11 owner of the asset 1 can enroll on the digital platform 9 and subsequently access it through a normal authentication operation, utilizing its own mobile device 7 or any other device adapted to interact with the digital platform 9, for example a computer.

As shown schematically in FIG. 1, an information block 23 forming part of the blockchain 21 is generated by means of information originating from the digital platform 9. Reference numeral 25 indicates by way of example an information block generated with a smart contract and for which storage in the blockchain 21 is requested. FIG. 1 also schematically shows that the insertion of the information block 25 in the blockchain 21 can require the consent of one or more of the authorized participants. Which participants must give consent to the recording of a determined information block generally depends on the type of information to be recorded and it is determined by the related smart-contract, which must be activated to generate the respective information block.

Any subsequent activity in which the asset 1 participates, or which is carried out on the asset 1, can be recorded through a smart contract by means of the digital platform 9, which, after acquiring consent by one or more authorized participants, stores it in the blockchain 21.

Activities that can be recorded and stored in the blockchain 21 can comprise any activity carried out to preserve or increase the value of the asset 1. For example, any transfer of ownership of the asset, any repair, maintenance, restoration, check, inspection operation, etc., can be recorded in the blockchain 21, for example periodic maintenance or inspections of cars, periodic cleaning of weapons or watches, replacement of wearable parts or of parts that were damaged as a result of fortuitous events, such as accidents. The activities that entail inspections or maintenance work on the asset, for example, can also provide for recording in blockchains data and information about the wear of the asset, its deterioration, or concerning anomalies due to an improper use of the asset, the installation of non-original spare parts, or other events that can deteriorate the value of the asset over time.

The authorized participants of the digital platform 9 that from time to time are parties in the smart contract can change depending on the type of smart contract, i.e. of activities or interventions carried out on the asset 1.

For example, in the case of repair, maintenance, periodic test of an asset, such as an automobile, a watch, a weapon, a photographic camera, the authorized participants that are parties of the respective smart contract and that have to give consent to the recording of the related data in a blockchain, can typically be the owner 11 of the asset 1 and the official or authorized workshop or laboratory.

In some cases, the consent of the manufacturer 12 of the asset 1 can also be required. This can be required for example to allow the manufacturer of the asset 1 to verify that a given intervention was carried out by a dealer authorized to perform that type of intervention and/or that a repair was carried out using a spare part supplied by a supplier 13 authorized and certified by the manufacturer 12.

In general, for every event that involves the asset 1, the unique identifying code of the asset will be acquired by one of the authorized participants. For example, if a periodic check is carried out (typically periodic servicing of a car, cleaning and tuning up of a watch), the unique identifying code contained in the electronic apparatus 3 associated with the asset 1 will be detected by the authorized workshop or by the authorized laboratory, through a suitable reader. To this unique identifying code information about the operations carried out will be associated, in particular the typical operations that are carried out to perform periodic services, with any information about the replaced parts, the refilled or added consumable materials (lubricating oil, brake fluid, filters, brake pads, etc.).

Replacing parts may require the use of original spares. In this case, one or more identifying codes of the original parts used for the replacements can be acquired and stored in a same data block.

All data concerning the operation carried out are transmitted by the authorized participant (for example the authorized workshop, or the owner 11 of the asset 1) to the digital platform 9, through which the acquired data are stored in the blockchain in association with the respective unique identifying code of the asset 1, after acquisition of consent. The reading of the unique identifying code contained in the electronic apparatus 3 associated with the asset 1, on which the work was performed, can be carried out for example by means of a reading device 7 of the owner 11 of the asset 1 and/or of the party that performed the work.

As mentioned above, each specific smart contract with which to generate the data blocks that have to persist in the blockchain, may provide that the consent of specific authorized participants shall be obtained.

For example, in the case of repair work, consent may be required from the party that carried out the repair activity (authorized repair workshop or other dealer 15, 17), from the owner 11 of the asset 1, from the manufacturer 12 of the asset, possibly from the supplier or suppliers of the spare part or parts utilized.

In case of sale to a third party, the user 11 owning the asset 1 can access the digital platform 9 providing the data of the sold asset 1, read through its own mobile device 7, for example, and the data of the new owner. The latter may enroll on the digital platform 9 to exploit all functions made available by it. Before the transaction (sale of the asset) is closed, the new purchaser can access all information related to the asset to be purchased, stored unalterably in the blockchain 1.

This allows the new purchaser, for example, to verify the actual origin of the asset he intends to purchase. In the blockchain all previous ownership transfers will be stored, until reaching—backwards—the agreement for the sale by the manufacturer 12 to the first owner 11. It will also be possible to verify all work carried out on the asset 1. This allows on one hand to verify for example that the prescribed periodic checks (inspections, servicing, etc.) have been carried out, that they were carried out through authorized participants (authorized workshops) and with what outcome. Any repair and/or parts replacement work may be verified, as well as any other matters useful or of interest for the new future owner in order to verify the integrity of the asset and its value.

The owner of the asset 1 or other authorized participants can acquire and store additional information, for various purposes, for example in the format of videos, images or multimedia files. This additional information can be stored in the blockchain, or separately and externally thereto, especially when it is in files that occupy large memory spaces. The integrity of these files, not persistent in blockchains, can be guaranteed as mentioned above by the presence in blockchains of a digest or hash of the files.

In the case of assets 1, such as for example a luxury car, whose delivery times can be very long, the manufacturer 12 can use the described system to provide the new purchaser 11 with information about the progress of his/her order, possibly also in the form of multimedia file. On one hand, this information increases the set of data concerning the asset 1, and on the other hand it allows the purchaser to follow step by step the evolution of the purchase order, for example receiving images or audio and video files that show various steps of the production process of the complex asset that was purchased.

The system described also allows the user 11 to store, in blockchain or separately and externally therefrom, information pertaining to events or facts in which the asset 1 participated. In the case of vehicles, the events can for example comprise parades, competitions, exhibitions, etc. This information can increase the value of the asset, and it can be useful to the second owner and/or when appraising the asset, for example for the purposes of its estimation in case of auction. The recording in blockchain of events occurred to the asset or in which the asset participated, including the information about who the owner was over time, is stored in blockchain so as to be unalterable and hence incontrovertible in subsequent transactions.

All this information can constitute a set of data paired to the asset 1. Those who generate the information (for example the manufacturer, the dealer, or the owner) or those who manage it (normally the owner) can decide whether a determined item of information has to be made accessible for example to third party authorized participants, such as, by way of example, the new owner of the asset. In this case typically the information follows the asset 1 in case of sale to third parties.

Vice versa, in some cases the information can be classified as personal and confidential property of the owner 11a of the asset 1, who can choose to make it inaccessible to third parties and not transferable together with the asset.

The operations that can involve the asset 1 and that can be carried out by means of the digital platform 9 are very numerous. Continuing to refer to FIG. 1, in FIGS. 2 to 6 are shown sequences exemplifying some particularly significant operations, which can be carried out through the digital platform 9.

In each of the FIGS. 2 to 6 the elements of the system described in FIG. 1 are represented, which come into play in the operations or transactions described with reference to FIGS. 2 to 6. More in general, the diagrams of these figures show: a generic first user, customer or owner 11*a* of an asset 1; a generic second user 11*b* (FIG. 6); a generic application that can run on the mobile device 7, which application is shown schematically in FIGS. 2 to 6 with a block identified with the reference numeral 7; the electronic apparatus or sensor 3 of the asset 1; the digital platform 9, represented as a block 9A representative of the APIs made available by the platform 9 and a block 9B representative of a backend; the blockchain 21; a generic dealer 15.

The backend 9B allows the internal management of the information flow of the digital platform 9 by the users or participants authorized for the various functions. More specifically, the backend 9B allows commercial users (e.g. dealers, builders) to manage their own assets and their own customers, i.e. the users 11. The backend 9B also allows to expose the APIs 9A for interfacing with the digital platform 9, and provides the interface for the persistence of the information on the blockchain.

Figure 2:
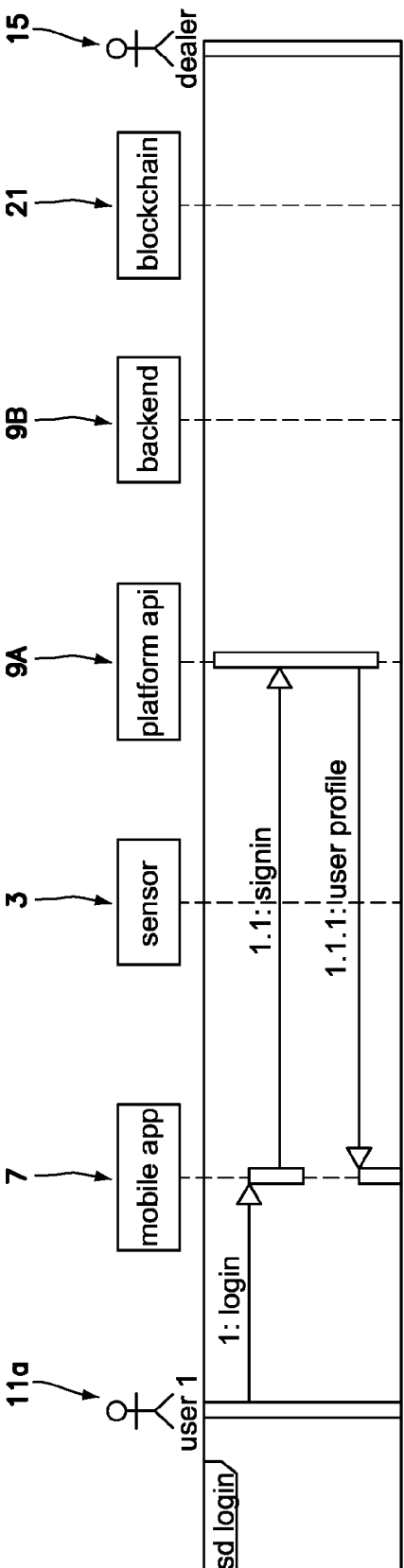
FIGS. 2, 3, 4, 5 and 6 examples of time sequences of exchanges of information and data with the method described herein in relation to exemplifying operations that can be carried out in relation to an asset.
Figure 3:
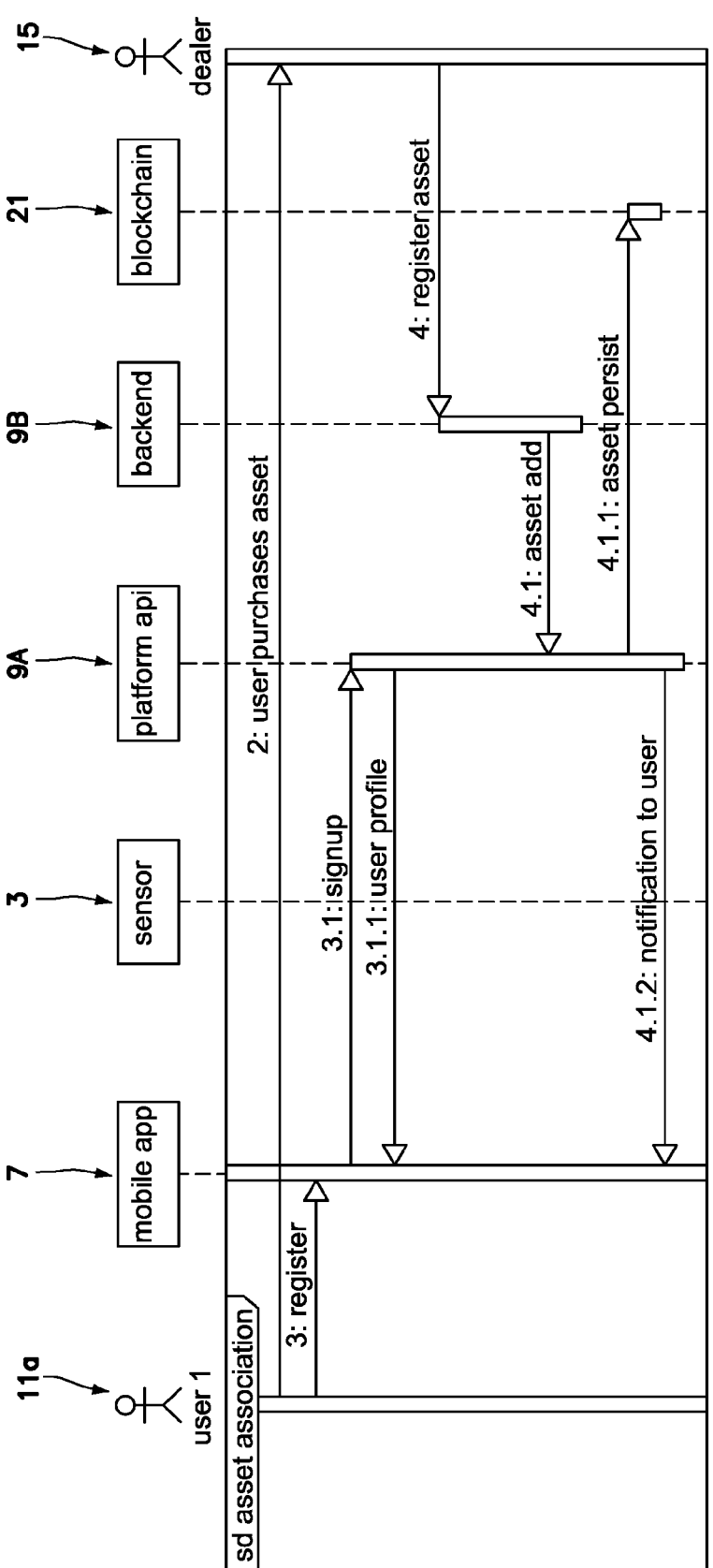
Figure 4:
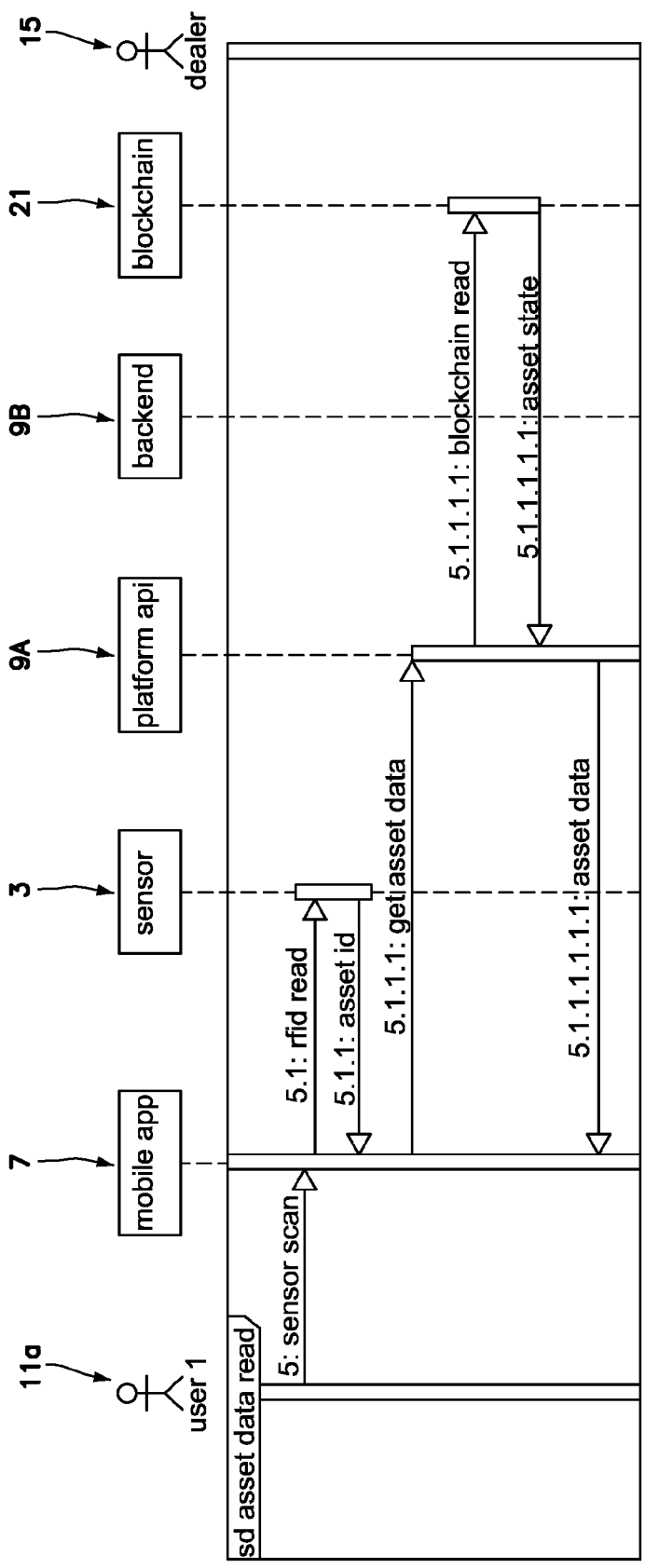
Figure 5:
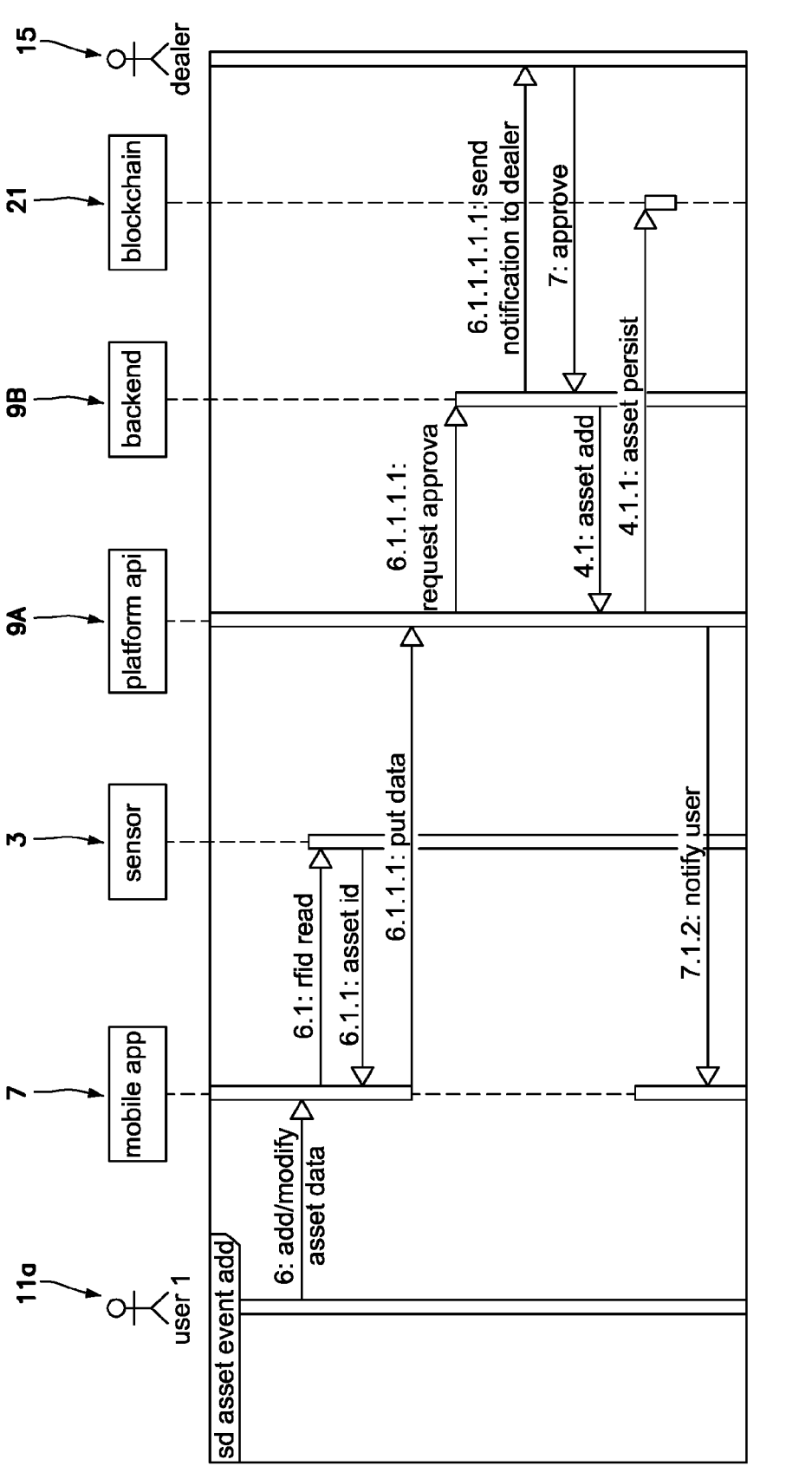
Figure 6:
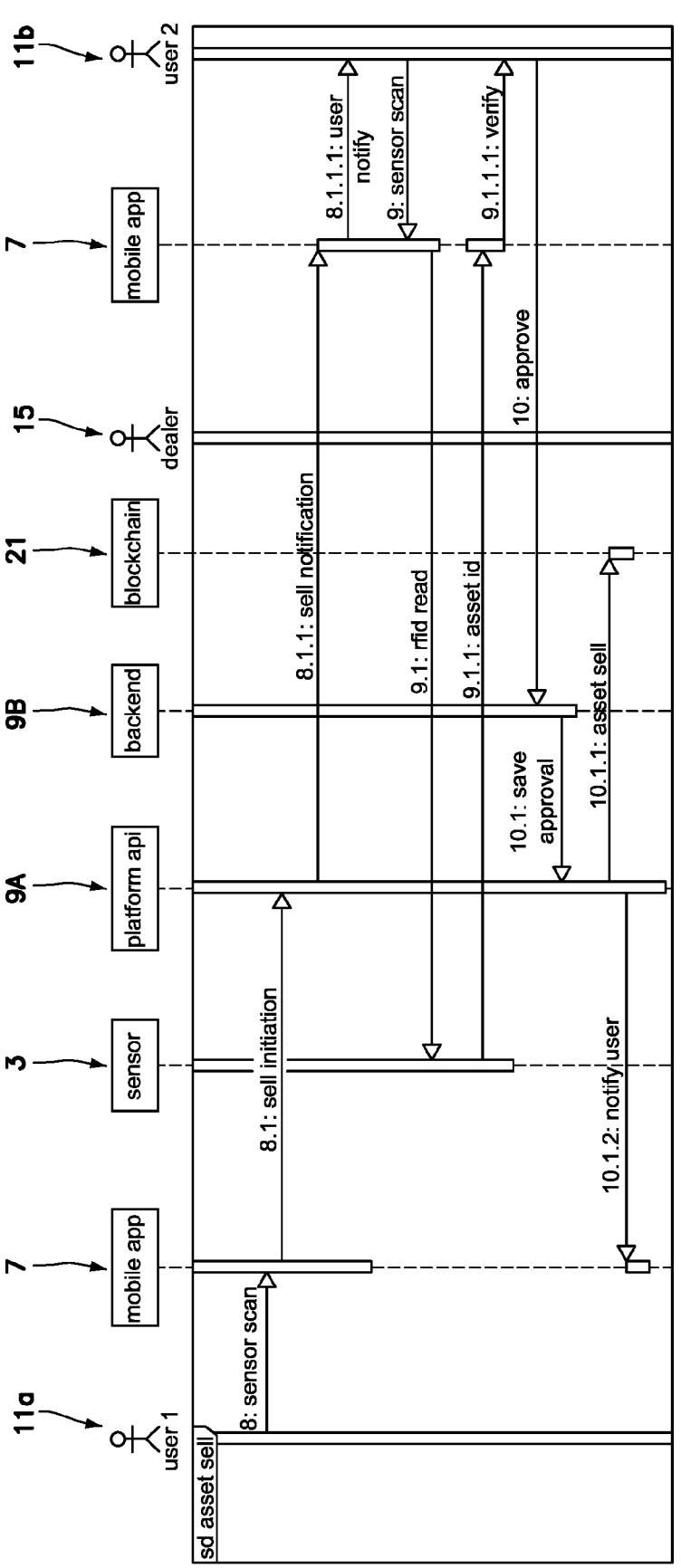

FIGS. 2 and 3 schematically show operations that do not require reading the unique identifying code contained in the electronic device 3 of the asset 1. FIGS. 4, 5 and 6 indicate operations that actively involve the electronic apparatus 3 and the unique identifying code stored therein.

More specifically, FIG. 2 illustrates a login sequence of a generic user already enrolled on the digital platform 9. The login can take place through a mobile application installed on the mobile device 7 provided to the user, for example the owner 11*a* of an asset 1. The application installed on the mobile device allows various operations including, in addition to access (login or sign in) to the digital platform 9 of already enrolled users, also to sign up to the digital platform 9, to manage the user's assets, and to display and modify the data of the user's assets. Signing up to the digital platform 9 can involve the use of certificates and/or of procedures known as KYC (Know Your Customer).

To the login request (step 1.1 in FIG. 2) the digital platform 9 responds by sending the user's profile to the mobile application (step 1.1.1). Once the steps 1.1 and 1.1.1 are completed, the user is connected to the digital platform 9 and can carry out one or more operations, some of which are described hereafter with reference to the sequence of FIGS. 4, 5 and 6.

A similar sequence can be provided for login by a different authorized participant, for example by the dealer 15, 17, through his/her own mobile device 7, on which an application identical to that of the user 11*a* can be installed, or through a computer utilizing a web platform.

FIG. 3 illustrates a sequence related to the purchase of an asset 1 (step 2). With the purchase of the asset 1 the user 11*a* has to enroll on the digital platform 9 to utilize its various services, if (s)he is not enrolled already. For this purpose, an enrollment step is shown in FIG. 3 (steps 3, 3.1 and 3.1.1). Through the mobile application installed on the mobile device 7 the user requests enrollment (step 3.1) on the digital platform 9, which responds (step 3.1.1) by sending his/her profile to the user. The user enrollment step comprises the assignment of a unique identifying code of the user (customer ID) to the user by the digital platform 9. The digital platform 9 stores the user's data and the customer ID code associated therewith.

The dealer 15, or other authorized participant whereat the user 11*a* purchased the asset, can access the digital platform 9, finds the data of the enrolled user and associates it with the order of the asset 1 that the user has purchased carrying out a step of enrolling the asset (step 4) through the backend 9B. In step 4.1 the data of the asset are stored in the database of the digital platform 9. The digital platform 9 notifies the user 11*a* of the enrollment of the asset (step 4.1.2) through the application of the mobile device 7.

The purchase of the asset can be recorded in the blockchain (step 4.1.1) through a smart contract and requesting consent for storage thereof in the blockchain 21. The information block created through the smart contract can contain the identifying number of the user or customer 11*a* (customer ID), the identifying data of the electronic apparatus 3 that will be applied to the asset 1, an identifying number of the asset, for example the vehicle identification number in the case of a car, the identifying data of the dealer 15, the identifying data of the manufacturer 12, and any data related to the production plant (production site) and to the date of production.

When the owner 11*a* of the asset has got possession of the asset 1, (s)he can use the electronic apparatus 3 installed thereon to carry out a plurality of operations.

FIG. 4 shows an access sequence to the data contained in the blockchain 21 by a user 11*a* for simple consultation. This sequence is preceded by a login or sign in sequence (FIG. 2) by the user on the digital platform 9. The access sequence to the data in blockchain 21 comprises a first step of scanning the RFID tag (electronic apparatus 3) incorporated in or applied to the asset through the mobile device 7 (step 5.1). The RFID tag or other electronic apparatus 3 provides the unique identifying code of the asset (step 5.1.1) to the application installed on the mobile device 7, so as to allow the transmission of the unique identifying code of the asset to the digital platform 9 (step 5.1.1.1).

The digital platform 9 can provide access to all the data of the asset 1, to no data or to a part of the data, according to the profile of the user who requested access to the data.

As stated above, the steps illustrated in FIG. 4 are subsequent to the step of signing up by the user, who has a unique user identifying code (customer ID) and an application installed on his/her own mobile device 7. Therefore, in theory any user enrolled on the digital platform 9 can scan and read the RFID tag of any asset, both owned by him/her, and owned by a third party, who is enrolled on the same digital platform 9. In general, some data related to a generic asset 1 can be public, while others can be accessible only to the lawful owner of the asset, or only to a dealer 15, 17 or to the manufacturer 12. The digital platform 9 is able to recognize the user 11*a* that accesses the digital platform 9 to request consultation of the data of a determined asset whose RFID it scanned and therefore it will send in reply to the request only the data which that user has the right to know, if any.

The digital platform 9, after ascertaining (on the basis of the user's credential) that the connected user 11*a* is entitled to access the data (or some of them) related to the asset 1 whose unique identifying code was scanned through the mobile device 7, requests the data from the blockchain 21 in the step 5.1.1.1.1, receives them (step 5.1.1.1.1.1) and transmits them to the user who requested them (step 5.1.1.1.1.1.1) and who can display them through the application on his/her own mobile device 7.

The sequence described with reference to FIG. 4 can be carried out typically by the owner of the asset 1, but it can also be carried out by other authorized participants, whose profile allows access to some or to all the data of the asset. Typically, a dealer 15, 17 or the manufacturer 12 of the asset will in general have authorization to access the data contained in the blockchain 21 and related to the asset 1, for example to verify which maintenance, checking, revision, repair work was carried out on the asset, on what date and by what entity.

As is readily apparent from the time sequence represented in FIG. 4, the sensor or electronic apparatus 3 applied to the asset 1 is an integral part of the system for managing the data and the information pertaining to the asset 1. In general, once the asset 1 is manufactured, all operations associated therewith will be carried out after acquiring the unique identifying code of the asset 1 by scanning the electronic apparatus 3 associated therewith.

FIG. 5 schematically shows the time sequence of a generic operation that entails the modification or addition of data of the asset 1. This operation, described with reference to FIG. 5 in general terms, may be any operation that impacts on the data associated with the asset 1, modifying them and keeping track, unalterable in time, of the modification.

In general, the sequence for modification of the data of the asset 1 may be requested by any authorized participant, similarly to what is described in the sequence for access to the data of the asset 1 (FIG. 4). Modification of the data of the asset 1 will normally be selectively allowed only to some of the authorized participants, enrolled on the digital platform 9. The selection can generally be carried out on the basis of the profile of the participant requesting access and modification, on the basis of the type of data whose modification is requested and on the basis of the type of modification that is being requested.

For example, an authorized participant 15, 17 that serves as a repair workshop will have authorization to modify the data concerning maintenance, repair or checking operations on the asset. Only the owner 11a will instead have the possibility of initiating a process of modification of the data that imply a transfer of ownership of the asset to another person.

Some data modification operations may require the simultaneous presence of multiple entities. For example, repair or maintenance work on the asset may require, to be recorded in blockchain, the consent not only of those who perform it (dealer 15, 17), but also of the owner 11a of the asset who has to confirm completion of the work. Ownership transfer operations must generally have the consent of those selling the asset (the transferor), of those purchasing the asset (the transferee, new owner of the asset) and of a dealer or other authorized participant, who certifies the chain of ownership transfers, stored in the blockchain, confirming the lawfulness of possession of the asset 1 by the user who is selling it.

Returning now to FIG. 5, the sequence to add or modify data related to an asset 1 comprises a step of scanning the unique identifying code of the asset 1 through the mobile device 7 (step 6.1) and acquiring (step 6.1.1) of the unique identifying code. Through the application of the mobile device 7, with which the unique identifying code was acquired, the user 11a can send the data to be added or to be modified to the digital platform 9 (step 6.1.1.1). The digital platform 9, through the backend 9B requests approval for the modification (step 6.1.1.1.1) for example from the dealer 15. The step 6.1.1.1.1.1 represents the notification to the dealer 15 of the request for modification of the data or of addition to the data. The dealer 15 can approve the request (step 7, 7.1) through the backend 9A to the digital platform 9. With the approval of the dealer the modified or added data is recorded in the blockchain 21 (step 7.1.1).

The sequence shown schematically in FIG. 5 can be used to add data, also in the form of multimedia files, such as video, audio, image files, or text files. These data can be intended to be stored in the blockchain, or in a separate database, for example accessible through the digital platform 9. In this case, too, as has been mentioned above for multimedia files generated by the manufacturer 12 or by the suppliers 13, of a file that is not stored in the blockchain 21 as such a hash or digest may be generated, which is vice versa stored in blockchain.

The data can be personal of the owner 11a of the asset 1 and follow the owner 11, instead of the asset 1, in case of sale of the asset. Conversely, the data can be associated with the asset 1 and follow the asset becoming accessible to the new owner in case of sale of the asset 1.

In some embodiments, when a user 11, typically the owner of the asset 1, wishes to insert in the blockchain 21 a data item that remains in the history of the asset 1, the following process can be provided. The user, for example the owner of the asset 1, creates the content to be stored, for example an image file or a video file. If the user wishes to certify the content to be stored, the mobile application can provide the user with an indication of which person may certify the content to be stored, for example a dealer 15, 17, or even the manufacturer 12 of the asset 1. Through the mobile device 7 and the application installed thereon, the user 11 acquires the unique identifying code of the asset 1, with which the data is to be associated, scanning the electronic apparatus 3. The information is transferred with a certification request to the entity enabled to provide certification. The entity (e.g. the dealer) certifies the information content, which will be added to the blockchain 21 through a smart contract. The data block can contain: the user's identifying code (e.g. the customer ID), the identifying code of the dealer 15, 17 or of another entity which provides consent to storage in blockchain, the unique identifying code of the asset 1, the generation date of the information block, the information to be stored.

A maintenance/repair/addition/parts replacement operation can take place with a time sequence similar to that of FIG. 5.

FIG. 6 shows a time sequence of operations for the transfer of an asset 1 from a transferor 11a to a transferee 11b.

The transferor (user 11a) reads through the mobile device 7 the unique identifying code of the asset (step 8) and starts the sale procedure (step 8.1). Through the digital platform 9, a notification is sent to the application installed on the mobile device 7 of the transferee 11a. The user 11b performs with his/her own mobile device the scan of the same electronic apparatus 3 of the asset 1 whose ownership transfer is being recorded (step 9, 9.1). The unique identifying code is sent to the application of the purchaser (step 9.1.1), the purchaser verifies (step 9.1.1.1) and sends an approval (step 10) of the purchase of the digital platform 9. The platform 9 sends a notification to the transferor 11a, stores the approval of the acquisition by the transferee 11b (step 10.1) and stores the ownership transfer in the blockchain 21 (step 10.1.1).

The above description referred to FIG. 1 assigns particular relevance to the production step of a complex asset. One of the participants authorized by the digital platform 9 is the manufacturer 12.

However, the system described has very broad applicability to altogether different situations. In some embodiments, instead of a manufacturer 12 of assets 1, the authorized participant 12 can be a rental company of assets, such as by way of example (but not exclusively) means of transport. In this case, each asset (automobile or the like, for example), that is purchased by the rental company, can be associated with its own unique identifying code which is then utilized to record with blockchain technology through the digital platform 9 all events related to the utilization of each individual asset. In this way, a fleet of automobiles can be managed, for which of each vehicle in the ledger with blockchain technology there are stored unalterably the events involving the asset, in particular: the sequence of rental agreements, work involving maintenance, upgrades, replacement of worn parts, repairs in case of failure or accident, and any transfer to third parties or any other event that can be recorded in blockchain, in particular through a smart contact.

As mentioned, the system and the method described can be used to manage different assets from industrial or consumer products. For example, it is possible to associate with a art work, with an archeological find, with an antique car or another antique object, as well as with any article, of which even a single specimen exists, a unique identifying code, with which subsequently to record in blockchain information about the asset 1. This allows to create an unalterable chain of information blocks, related to the asset in question, for example to keep track of the events undergone by the article or in which the article has participated, such as, in particular: sales and transfers for any reason and in any form; participation in exhibitions; inclusions in monographic publications, in exhibition catalogs, in periodic publications or in books; or other events that can contribute to increase the value of the artefact. In this case, differently from what has been specifically described more in detail above with reference to FIG. 1, the asset production phase is not of interest, but it is rather of interest prevalently what takes place in the subsequent phases.

Typical examples of unique articles, which have their own particular market, can be (in addition to art works) also parts of components of iconic assets that, at the end of their lifecycle, represent items of interest, for example for collectors. Consider for example parts of industrial items, such as automobiles or others, that are separated from the original asset for example as a result of accident or disposal of the asset. These parts can be the subject of sales through persons connected for example to the manufacturer of the original asset, typically through official dealers or licensees.

For example, the unique identifying code can be associated with the asset, for example with a work of art, at the time of the acquisition by an auction house or by an art merchant. In the blockchain can be recorded, as a first information block, the unique identifying code, the data of the auction house, data of the owner or data on the origin and others. For example, multimedia files, typically images, that illustrate the artefact can be associated with the asset. As mentioned above in relation to industrially manufactured items, in this case too the multimedia file can be stored in the blockchain, or in a different memory location, for example in a database on the server of the auction house. To guarantee the unalterability of these files it is possible to generate a hash or a digest thereof, which is stored in the blockchain.

Subsequent events involving the asset, such as sale, exhibition, publication or mention in articles, essays, books etc., can be recorded in blockchain. The recording may be subordinated to the consent of one or more authorized participants from a digital platform 9.

As in the case described above, the digital platform 9 can be managed by a third party, extraneous to the auction house (as stated previously, this may be a third party with respect to the authorized participants 12-17; FIG. 1). In other embodiments, the auction house itself may create and manage the digital platform. Third parties authorized to interact with the digital platform can, for example, be persons interested in the specific market of the asset in question, for example the market of works of art.

In the specific case of works of art, antiques and similar assets, the unique identifying code is preferably associated with the asset without incorporating it or physically applying it to the asset, to avoid deteriorations thereof, as schematically represented in FIG. 1, when the asset is an art work or another similar item, the unique identifying code can be applied on a support separate from the asset, for example on a certificate of guarantee or of authenticity.

Differently from what currently takes place, the unique identifying code is related to data stored in blockchain, which represents a qualifying element of the system described herein. Essentially, even if the unique identifying code is not physically applied to the asset, it represents—with respect to the simple serial number or other identifying code in use today—an innovative element because it becomes a means for the persistence in blockchain of a sequence of information blocks or data, unalterable by nature of the blockchain, which guarantee the stability and/or the increase of the value of the asset.

Unique identifying codes associated with an asset without being applied directly can be utilized advantageously for other categories of assets as well. For example, in the case of consumable goods, such as food or pharmaceutical products, the unique identifying code can be applied on the package or on a support placed inside the package of the asset. The unique identifying code 3, in combination with the services of the digital platform 9, allow a complete traceability of the asset, thanks to the persistence in blockchain of the information related to the events that involve the asset, such as the information related to the ingredients utilized for the production of the asset, which are similar to the components of a capital good, such as an automobile or a watch, of the examples mentioned above.

The platform 9 allows to implement other functions, in addition to those described above. For example, geofencing functions or services can be implemented with the illustrated system.

As is well known (see Wikipedia, "geofencing"), a geofence (or virtual fence) is a virtual perimeter associated with a geographic area of the real world. It can be generated dynamically, for example as the area within a radius from a pre-set point, or it can be defined by a set of predetermined borders. The use of geofences is known as geofencing and it typically entails the use of devices able to determine their own position. Typically, these devices can be smartphones, tablets, or other mobile units, used as terminals of a location-based service (LBS): when the user enters or exits a geofence, the mobile device and/or the manager of the service receives a notification, which can be used to control predetermined actions.

Essentially, geofencing is a service based on the position of a device with respect to a geo-fence. An APP or other software typically executed on a device or mobile unit (such as a smartphone 7) uses GPS, RFID, Wi-Fi or cellular data to activate a preprogrammed action, when the device or mobile unit or an RFID tag, or equivalent, enters a virtual fence (geofence) or exits therefrom.

In the present context, the platform 9 can be parameterized to obtain a geofencing function, parameterizing one or more smart contracts that are activated when one or more of the aforementioned conditions is met, of entry or exit of a mobile device into or out of a virtual border.

As clarified above, the asset 1 is able to participate in the consent that has to be provided to carry out a determined operation and/or to store an information block in a shared ledger. This is obtained through the integration in the system of RFID tag or other electronic device 3 on which the code is stored, which allows the unique identification of the asset 1. Using the device 3 the asset 1 can be detected actively or passively through any apparatus capable of interacting with the device 3. The apparatus can be an electronic gate, an industrial reader gun (mobile reader), antennas or mobile devices such as a smartphone or the like.

The platform 9 can activate complex mechanisms for participation in consent, i.e. in the preparatory function for example to the recording of information in the blockchain, starting from the detection of an asset 1 within a geo-fence and from the concurrent presence or detection in the same geo-fence of the participants designated for authorization of writing the related data inside the blockchain through the platform 9.

A typically illustrative, but non-limiting example of the use of the geofencing function consists of the use of geo-location data associated with particular events that involve the asset 1 and that are recorded in blockchain. Typically, geofencing can be used in association with operations to which the asset 1 is subjected during the entire lifecycle of the asset 1.

Geolocation data can be used, for example, to associate them with the assembly steps. The presence of the asset in a given plant of the manufacturer can be detected through readers for RFIDs or other devices 3 on which or in which is stored the unique identifying code of the asset or of a component thereof. The identifying code stored in the device 3 can be read for example through gates or industrial readers of RFID tags, which are associated with a determined virtual fence or geofence. In this way, with a determined step of assembly of the asset the geographic location thereof is associated. It is thereby possible to generate a chain of information blocks each of which contains geolocation information, which as a whole allow to store the transfers undergone by the asset in the production and assembly phase.

The data can be stored permanently in the blockchain and allows, for example, to verify even after some time in which plant the asset was assembled or through which plants it transited in the various production/assembly steps.

Similar geolocation information can be acquired and associated with information blocks related to other events undergone by the asset 1 or in which the asset 1 participated. For example, the data related to maintenance, inspection or repair work can be associated with geolocation data. In this case the presence of the asset 1 inside a laboratory, workshop or other location where work on the asset 1 is performed is detected through a geofencing function and stored together with other data related to the work.

Geolocation data can also be useful in case of sale or auction transactions of the asset 1.

In case of assets intended for rental it can be useful to store data related to the stipulation of the individual rental agreements succeeding each other over time. In case of vehicles, it is thus possible to store the location where the vehicle is picked up and returned by the individual who rents it. Each dealer, for example each branch of a rental company, can define a geo-fence and then record geolocation data together with the information related to the delivery of the vehicle to the person who rents it, or to the return of the vehicle to the rental company.

The platform 9 can also be used at the marketing level on the end customer. In other words, when a user 11 owner of an asset 1 will take part in an official event set up by the parent company (for example the manufacturer company) and/or by the official dealer in a determined location, the system will notify and enable the related owner to the recording of data of participation in the event and possible to the use of the asset by famous or well known persons (VIP) designated by the parent company as distinctive testimonials of the brand. This has a benefit for the manufacturer, in terms of publicity promotion of the brand, but also for the owner of the asset 1, whose value is increased by effect of participation in a given event in the presence of celebrities. Storage in a blockchain, with the possibility of also including geolocation data in the information block, allows at subsequent times to verify that the asset 1 has actually participated in the event, with consequent increase of its value.

In general terms, the platform 9 can be configured to provide a geofencing function, comprising a step of activating a pre-programmed action related to an asset 1, when said asset 1 satisfy a determined condition in relation to a geo-fence or virtual fence (geofencing). The term "condition" in relation to a virtual fence can mean in general for example any spatial relation with respect to a geo-fence, the presence of the asset 1 in the geo-fence, or the entry into, the transit through or the exit from the fence, or else the concurrent presence in the geo-fence of the asset and of one or more authorized participants, as provided by the specific pre-programmed action.

Having described in detail the various aspects of the method, with reference to FIGS. 7 to 10 some functions and main characteristics of the method and of the system illustrated herein will be summarized.

Figure 7:
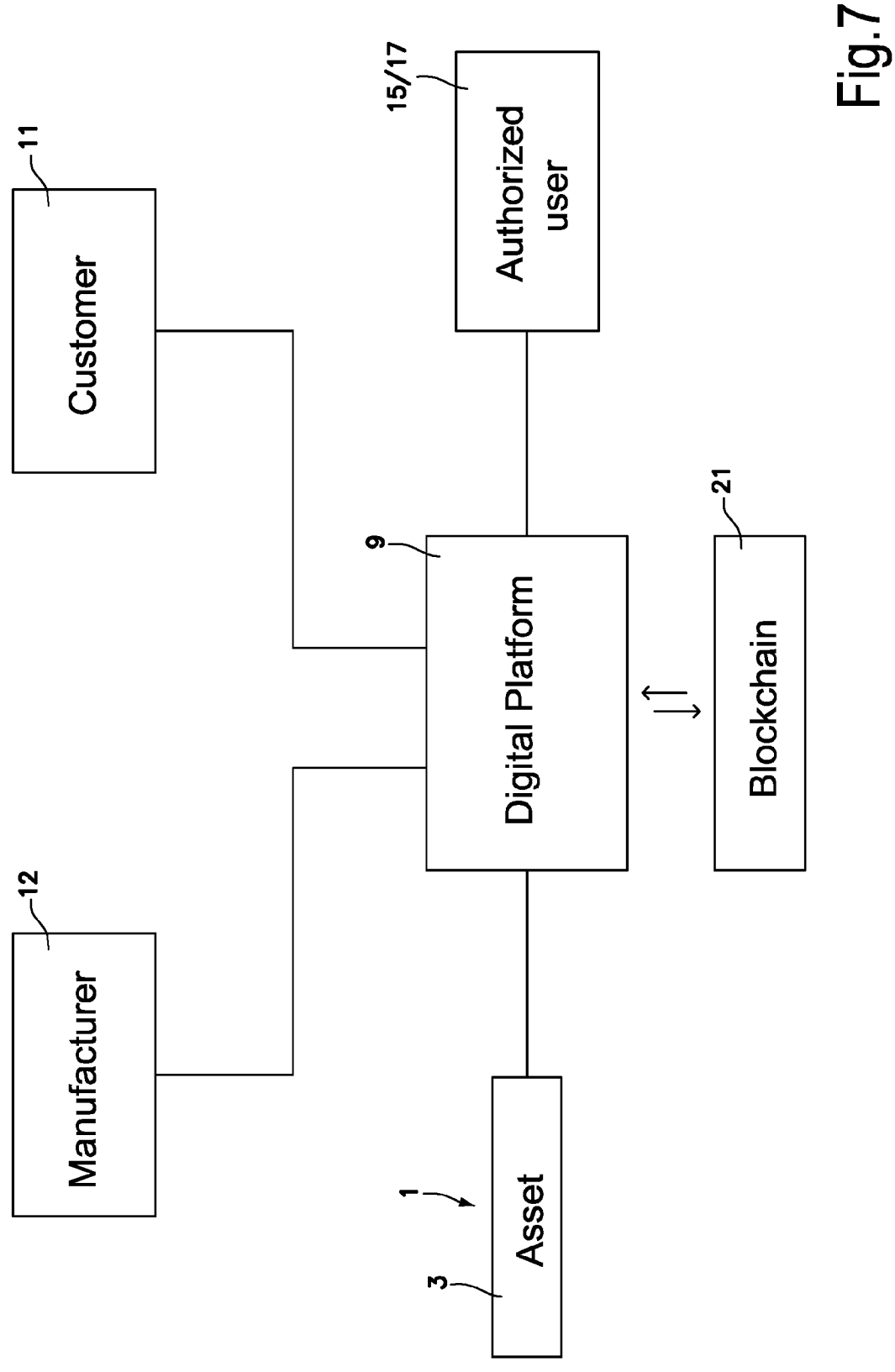
FIG. 7 a simplified version of the diagram of FIG. 1.

FIG. 7 represents the diagram of FIG. 1 in a simplified manner. In this figure, the digital platform 9 is represented in central position. It intercommunicates with the manufacturer 12 of assets 1 managed with the system described herein. In FIG. 7, a single generic asset 1 is indicated, with a unique identifying code 3. With the digital platform intercommunicate customers 11 and authorized participants (also referred to as authorized users) generically indicated with the reference numerals 15, 17.

Figure 8:
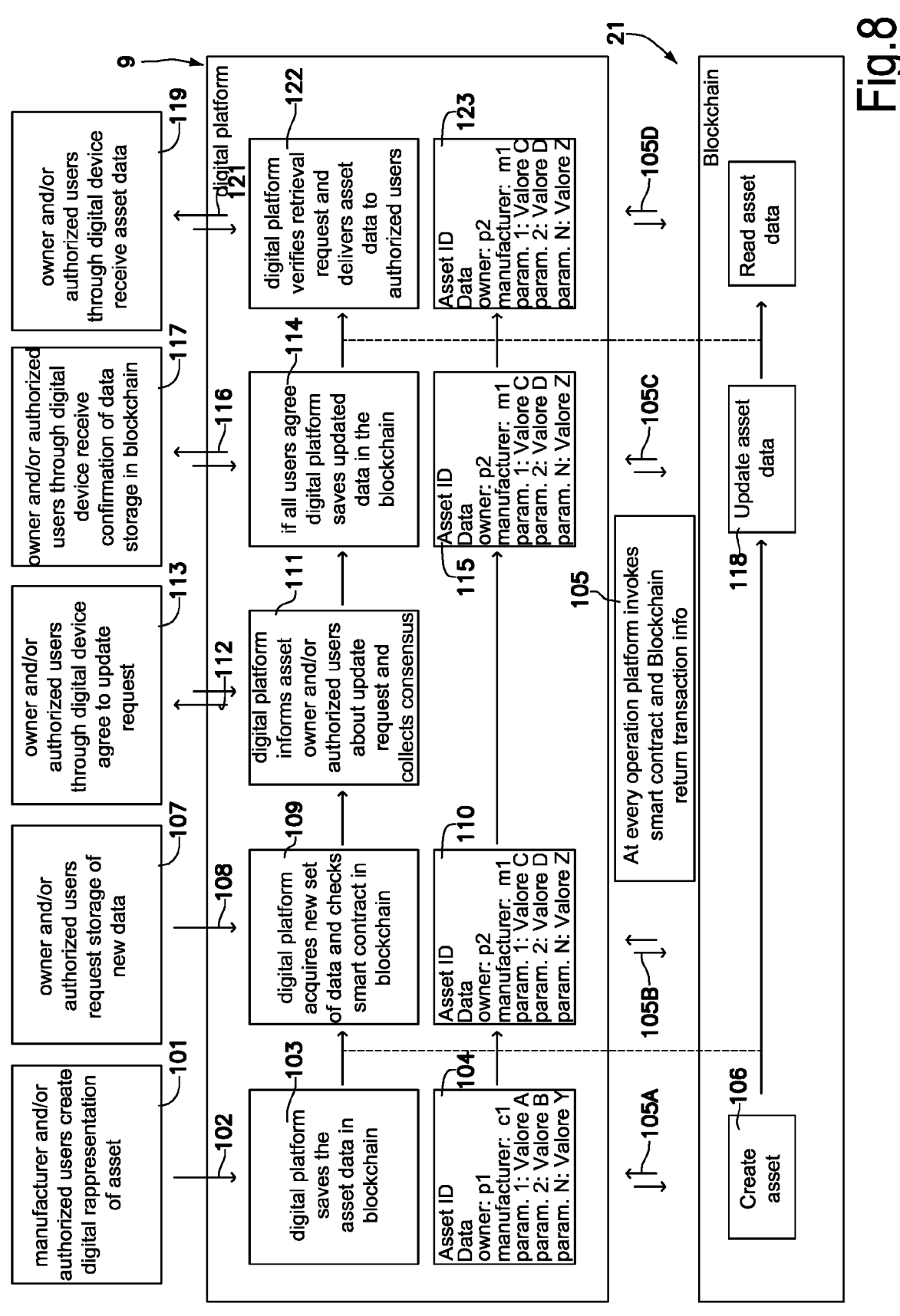
FIGS. 8 and 9 diagrams illustrating at high level an operating flow of the system of FIG. 1 in embodiments.

FIG. 8 is a graphic representation of the blockchain 21 and of the related process of collecting, managing and storing information on the blockchain 21 through the platform 9. In FIG. 8 the digital platform 9 is shown in central position, between the authorized participants and the blockchain 21, to visually represent the role of the digital platform which, unlike other systems of the current art, takes on an intermediary function between the authorized participants and the blockchain 21. More specifically, in FIG. 8 for greater descriptive clarity a distinction is made between categories of authorized participants, which include: the manufacturer of the asset, the owner of the asset, generic third-party authorized users, for example the dealers as defined above.

In block 101 the manufacturer 12 of the asset 1 creates a digital representation of the asset 1 and transmits the data (arrow 102) to the digital platform 9 requesting that they be recorded in the blockchain 21. This step essentially represents a first transaction, whose information forms an information block stored in the blockchain 21.

The request can be transmitted through an app on a mobile device, or more frequently through a computer or a server of the manufacturer, typically through the Internet.

In FIG. 8 the functions performed by the digital platform 9 are represented by the blocks included in the box that represents the digital platform 9. In particular, in 103 the digital platform saves the data of the asset 1 in the blockchain 21. The data are represented by the block 104 and can comprise the identifier of the owner (p1), the identifier of the manufacturer (c1) generic attributes 1, 2 . . . N indicated as value A, value B, value Y in addition to the identifying code ID of the asset 1. The data, whose storage and persistence in the blockchain 21 are requested, are transmitted by the digital platform 9 to the blockchain 21.

To each operation carried out by the digital platform 9 towards the blockchain 21 the digital platform 9 invokes the corresponding smart contract and the blockchain 21 returns the information about the operation or transaction (block 105, double arrows 105A). Specifically, the operation of creating the asset 1, or more exactly of representing it digitally, yields as a result the storage in blockchain 21 of the block 106 that contains the data of the asset 1.

The subsequent steps shown pictorially in FIG. 8 represent an operation of modification of the data stored in blockchain related to the same asset 1 to which the data block 106 refers. More specifically, the subsequent blocks of FIG. 8 represent the operations of requesting saving new data, verifying consent to storage, subsequent storage and persistence of the data as new block in blockchain 21, confirmation of the completed recording of the data. The information, i.e. the data, thus stored refer in general to a transaction, i.e. a generic operation to which the asset 1 is subjected. The transaction can be a sale, or a rental or lease agreement, participation in an event, maintenance, repair, inspection work, etc.

As indicated above, as a function of the data, whose storage in blockchain is requested, i.e. of the transaction whose storage and persistence in the blockchain is to be obtained in the form of information block associated with the identifying code of the asset 1, different smart contracts may be used and the consent of one or more authorized participants may be required. Which authorized participants have to provide their consent to the storage of the data in blockchain depends on the type of transaction to be recorded. Each smart contract indicates which authorized participants have to provide consent to the related storage of the transaction.

For example, a change of the data that implies the change of the owner of the asset requires, typically, the consent of the previous owner (transferor) and of the new owner (transferee). In some cases, the consent of an additional authorized participant may be required, for example of the manufacturer or of the authorized dealer.

Returning now to the pictorial representation of FIG. 8, it shows how the owner and/or another authorized participant (authorized user) requests the saving of new data and attributes of the asset (see block 107). The request is transmitted to the digital platform 9 (arrow 109). The request can be transmitted through an app on a mobile device, through a computer of an authorized participant that participates in the transaction, or in another way, typically through the Internet. A data change means any intervention on the data pertaining to the asset and hence in particular: the deletion of previously stored data, the addition of data that previously were not present, the change of data that were already present.

In block 109 the digital platform acquires the new set of data of the asset 1 and verifies the smart contract in blockchain, which regulates the transaction (i.e. the change of data of the asset 1). The digital platform 9 (block 105, arrows 105B) invokes the smart contract and the blockchain 21 returns the requested information. The smart contract also indicates which consent has to be obtained for the new set of data to be validly acquired and stored in blockchain. In block 110 the new set of data of the asset 1 is schematically represented, whose storage in blockchain has been requested (blocks 107, 108). Schematically and by way of example, as is understood from the comparison between the blocks 104 and 110, the new set of data indicates a change of the owner (from p1 and p2) and the change of the generic attributes 1, 1, N, from A, B, Y to C, D, Z.

In the next block 111 the digital platform 9 informs the owner of the asset and/or other authorized users of the received update request and requests consent (double arrow 112). The communication is carried out with respect to all authorized participants, whose consent is required for the storage of the data change on the basis of the invoked smart contract, which regulates the specific change requested. The authorized participants, whose consent is required (in the example of FIG. 8 the owner and/or other authorized users), validate the data update request (block 113) for example through a digital device, providing the respective consent. As in the case of the storage request, consent too can be sent through a portable device (smartphone, tablet, etc.), a computer, a server or other digital device with which the authorized participant is provided.

The digital platform 9 verifies that all authorized participants, whose consent is necessary for the storage of the new data, have provided their consent and saves the updated data (block 115) in the blockchain 21, block 105, double arrows 105C). The authorized participants that participated in the transaction receive (double arrow 116, 117) confirmation that the transaction has taken place and that the new data have been stored in the blockchain 21 (block 118).

The subsequent blocks simply indicate an operation of consultation (without modification) of the data stored in blockchain 21 for a determined asset 1. In particular, an authorized participant (owner or other user) through a digital device requests the reading of the data (block 119, double arrow 121). The digital platform 9 verifies the reading request and checks whether the requesting authorized participant has authorization to access the data (block 122), asks (double arrow 105D) for the data from the blockchain 21 and the data (block 123) are transmitted (block 122, double arrows 121) to the authorized participant who requested the reading.

In advantageous embodiments, some or all operations (i.e. changes of data) to be stored in the blockchain 21, can require the physical presence of the asset 1. This attributes more security and value to the stored data. For example, in the case of an ownership transfer, the respective smart contract may require the consent not only of the previous owner and of the new owner, but also the physical presence of the asset 1. This presence constitutes, de facto, an additional consent to be acquired by the digital platform 9. In practice, the storage and persistence in blockchain 22 of the updated data (block 118, FIG. 8) may require the consent of the asset (block 114, 116) that is obtained reading through a digital device the unique identifying code associated with the asset itself. If this code is stored in an RFID tag, for example, one of the authorized participants that have to provide consent to the storage of the new data in blockchain will read, through his/her own device, the code stored in the RFID tag. Typically, in the case of a transfer of the asset it may be required, for additional security, that the new owner (transferee) must certify the physical presence of the asset through acquisition of the identifying code by means of its digital device.

Similar considerations may apply, for example, for repair, maintenance, inspection, retrofitting work, etc. on the asset, carried out by a dealer 15, 17.

Figure 9:
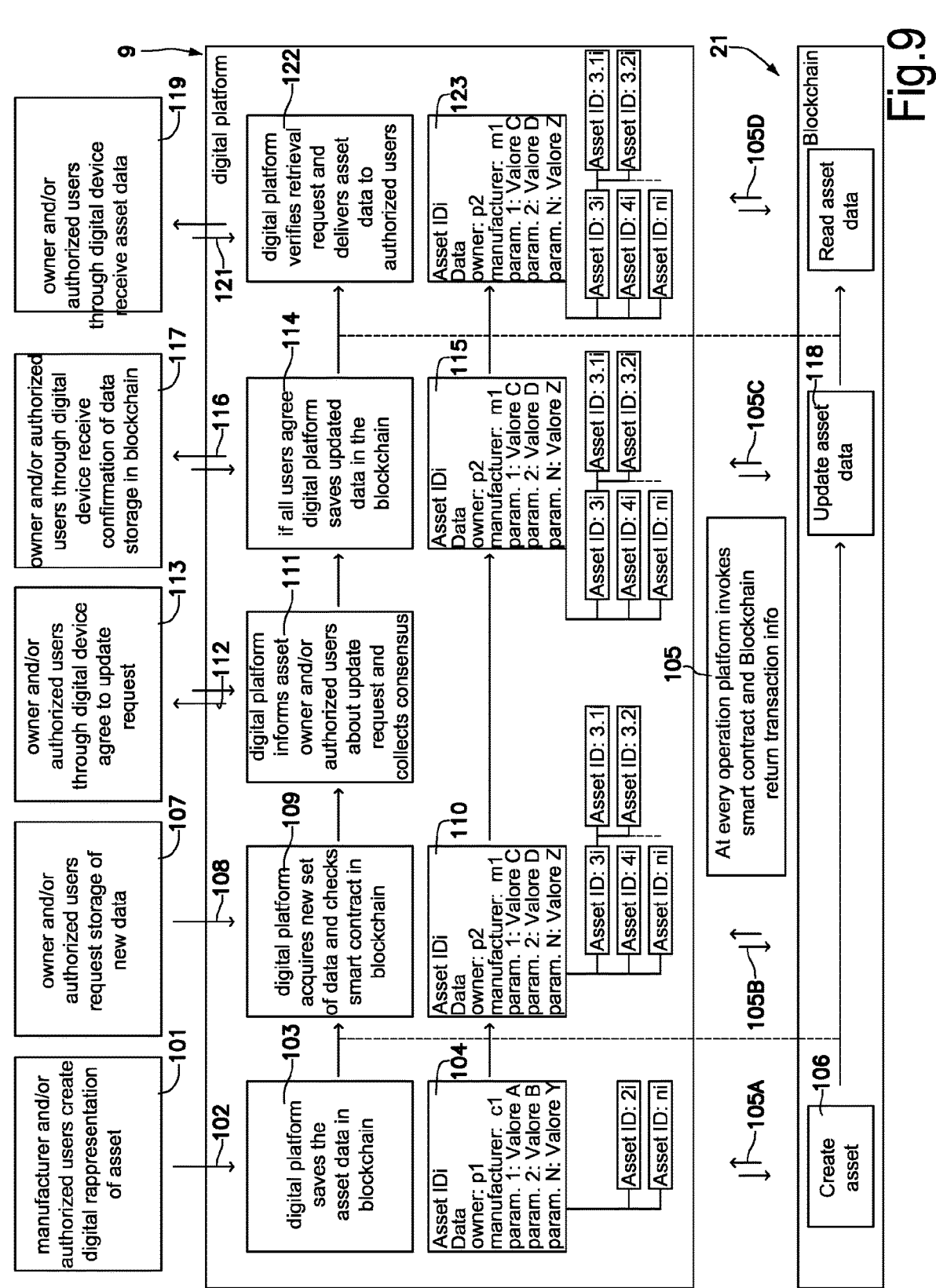

FIG. 9 represents the same chart as FIG. 8, in which the generic asset identified by the unique code IDi comprises a plurality of components or sub-assets identified by ID:Ni codes, each having its own identifying code. As mentioned above, complex asset can be characterized by the presence within them of sub-assets which in turn are marked by an identifying code and to which a digital representation in the blockchain 21 corresponds. This provides, for example, the possibility of verifying the origin and genuineness of given components, i.e. sub-assets, of the complex asset, typically also in the case of their replacement for repair or other purposes.

In FIG. 9 the blocks 104.*i*, 104.2, indicate the data related to two sub-assets ID:2*i* and ID:ni that are a part of the complex asset Idi. The blocks 110.1, 110.2, 110.3 indicate sub-assets ID:3.*i*, ID:4*i*, IDni that become part of the asset IDi as a result of the transaction whose storage is requested. The sub-asset ID3*i* in turn comprises its own sub-assets ID:3.1*i* and ID:3.2*i*. What is represented schematically in FIG. 9 can indicate for example the replacement of the sub-asset ID:2*i* with the sub-asset ID:4*i* and the addition of a component (sub-asset ID:3*i*), in turn consisting of sub-assets ID:3.1*i* and ID:3.2*i*, for example on the occasion of maintenance and upgrading work on the asset.

Figure 10:
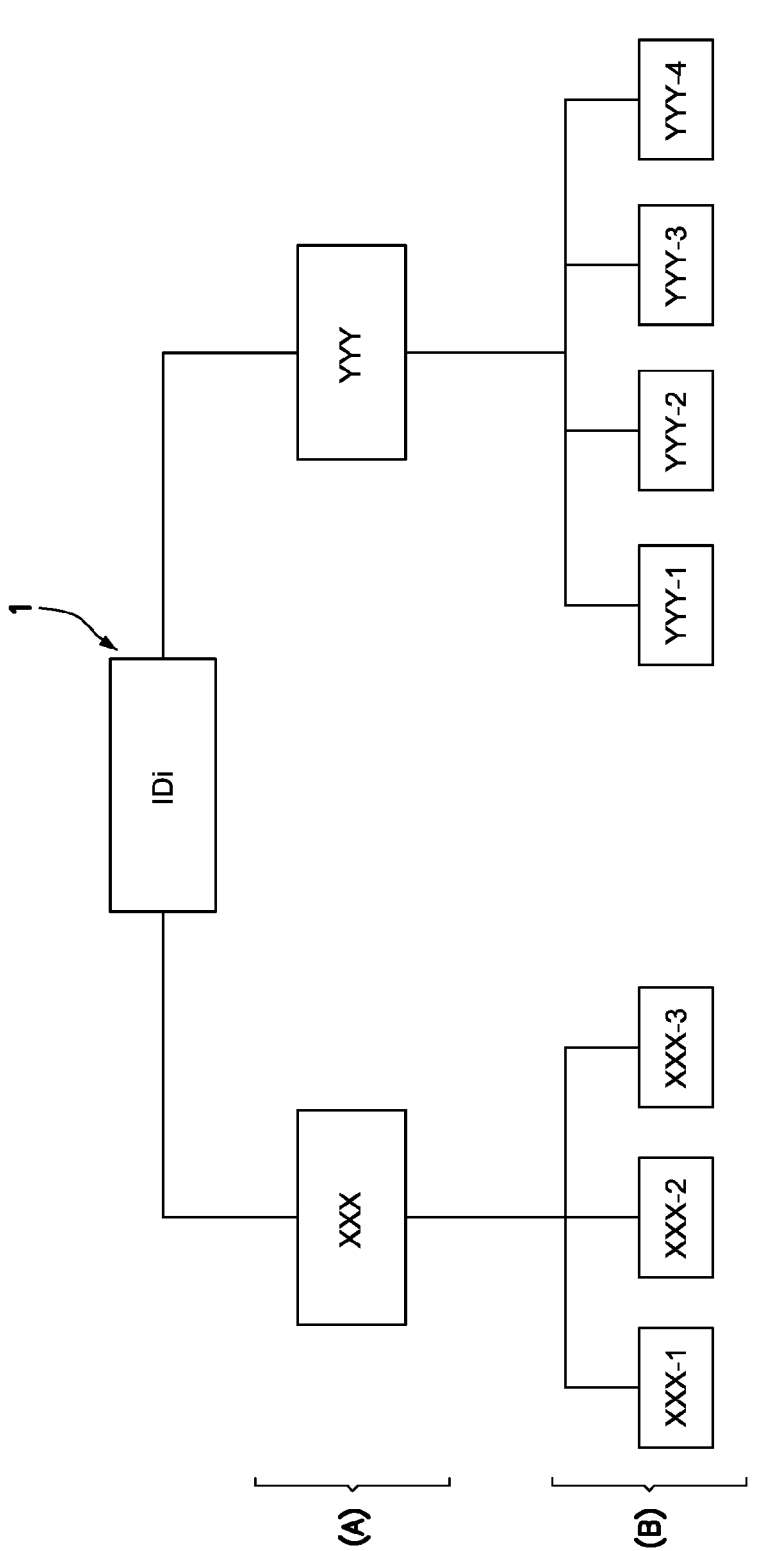
FIG. 10 a diagram of an asset comprising a plurality of sub-asset at different levels.

FIG. 10 and the following Table 1 provide a clearer illustration of the function performed by unique identifying codes associated with components, i.e. with sub-assets of a complex asset 1 and of their management in blockchain, already described above.

FIG. 10 schematically represents a complex asset 1 identified by an identifying code IDi. The asset 1 comprises two sub-assemblies designated as XXX and YYY, each of which represents a sub-asset. The two sub-assets XXX and YYY are in turn complex components, i.e. consisting of respective sub-assets. Specifically, the sub-asset or component XXX comprises its own components or sub-assets XXX-1, XXX-2, XXX-3. The sub-asset or component YYY comprises its own components or sub-assets YYY-1, YYY-2, YYY-3, YYY-4.

Merely by way of example, the asset 1 identified by the unique code IDi can be a motorcycle, which comprises a powertrain XXX and a chassis YYY. The powertrain XXX in turn comprises, as its own sub-assets or components, the actual engine XXX-1, the transmission XXX-2 and the exhaust manifold XXX-3. The chassis YYY comprises a front wheel YYY-1, a rear wheel YYY-2, a frame YYY-3, brakes YYY-4 and other components (not shown), for example suspensions, steering, fuel tank, etc.

The powertrain XXX and the chassis YYY constitute first level sub-assets (level A), while the other components designated XXX-i and YYY-j (with i=1-3; j=1-4) are second level sub-assets (level B).

In the illustrated example, each of the listed components or sub-assets (both level A and level B) are marked each by its own unique identifying code. The following Table 1 shows the asset and its sub-assets or components, and indicates, in the last column on the right, the unique identifying code (ID) assigned to each component or sub-asset:

TABLE 1

| Asset ID | component | Sub-asset level A | B | code Type | ID |
|---|---|---|---|---|---|
| IDi | 1 | powertrain | | XXX | A.1.IDi |
| | 1.1 | | engine | XXX-1 | B.1.1.IDi |
| | 1.2 | | transmission | XXX-2 | B.1.2.IDi |
| | 1.3 | | exhaust | XXX-3 | B.1.3IDi |
| | 2 | chassis | | YYY | A.2.IDi |
| | 2.1 | | front wheel | YYY-1 | B.2.1.IDi |
| | 2.2 | | rear wheel | YYY-2 | B.2.2.IDi |
| | 2.3 | | brake | YYY-3 | B.2.3.IDi |
| | 2.4 | | frame | YYY-4 | B.2.4.IDi |

It is understood from Table 1 that each of the sub-assets listed is marked by a code (XXX, YYY, XXX-i, YYY-j) that indicates the type of the component. This code is the same for all components of the same type. For example, all frames of a given motorcycle model are marked with the article code YYY-4.

However, when a determined sub-asset or component is selected and associated with the asset identified by the unique identifying code IDi, to the sub-asset or component is attributed its own unique identifying code ID that contains information not only suitable to identify exactly what type of component it is (e.g., frame), but also to univocally identify the complex asset IDi for which the sub-asset is intended. Therefore, the unique identifying code of the frame of the asset IDi is marked in the Table 1 by the code B.2.4.IDi.

A second motorcycle, identical to the first, but identified by a unique code IDk, will have a frame whose unique identifying code will not be B.2.4.IDi, but rather B.2.4.IDk. Similar provisions apply for the other identifying codes of the components (subassets) of level A and of level B. Table 2 shows these codes for the asset IDk:

TABLE 1

| Asset ID | component | Sub-asset level A | B | code Type | ID |
|---|---|---|---|---|---|
| IDk | 1 | powertrain | | XXX | A.1.IDk |
| | 1.1 | | engine | XXX-1 | B.1.1.IDk |
| | 1.2 | | transmission | XXX-2 | B.1.2.IDk |
| | 1.3 | | exhaust | XXX-3 | B.1.3IDk |
| | 2 | chassis | | YYY | A.2.IDk |
| | 2.1 | | front wheel | YYY-1 | B.2.1.IDk |
| | 2.2 | | rear wheel | YYY-2 | B.2.2.IDk |
| | 2.3 | | brake | YYY-3 | B.2.3.IDk |
| | 2.4 | | frame | YYY-4 | B.2.4.IDk |

These unique codes, which will be contained in the bills of materials of the asset identified as IDi and of the asset identified as IDk, are stored persistently in the blockchain 21, so that at each time of the life of the asset 1 it is possible to identify both the individual components or sub-assets that are part thereof, and which of them, if any, have been replaced or added during the lifetime of the asset.

The strategy of inserting in the bill of materials, for all or some sub-assets, the additional identifying code until reaching the detail of the component, can generate the following advantages:

reduction of material stocks: management/monitoring of component quantities in a punctual manner both inside the warehouse bins and at the side of the assembly line. Possibility of using FIFO (First In First Out) logic to prevent deterioration of the materials and to identify in real time any potential anomalies, which prevent their installation on the final product in accordance with quality standards;

brand reputation, counterfeit prevention; guaranteeing the final product to consumers, through a system that shows that the asset was assembled solely with original parts, i.e. uniquely identified by the parent company;

quality control i. traceability: in case of esthetic, functional or other anomaly of the product, noted by the parent company, by third party company or by the end customer, not only is the lot traced, but also the time, date, year, in which the individual components or subassets, potentially involved, were manufactured;

ii. operating efficiency: the search for checking the lot of potentially anomalous components has smaller volumes, to the benefit also of faster remediation of the production at the retail level throughout the world, if necessary;

iii. continuous improvement: a more accurate diagnosis can be made of the root cause, concerning the anomaly noted on the component. Being able to identify date and time of manufacture of the sub-asset, it is possible to verify by which worker (manual process) or with which parameters and functional system indicators (automated process) the sub-asset was produced and/or assembled. If the defect on the end product is reported as chronic by the sales network and every single component of the lot is tracked, the database to decide to make a design modification/improvement is broader.

Pairing an identifying code of the asset to each identifying code of one or more sub-assets or components allows, when required, to check the conformity of the components of the complex asset also, for example, for the purpose of greater safety in the use thereof. For example, the manufacturing company may select at its discretion some or all components (sub-assets) that are part of the bill of materials of the asset, on which is physically integrated an identifying solution, i.e. on which a unique identifying code is applied, for example an RFID tag, a printed serial number, a QR code or the like. As is indicated above, each unique identifying code of each of the selected sub-assets is related to the identify of the final product in a digitally univocal manner. The orchestrated management of all identifying data of components (sub-assets) and product (asset) on the digital platform 9 can be used for example to prevent the operation of the asset, if parts are replaced with non-original spares.

The invention claimed is:

1. A method for associating information with an asset and storing said information in information blocks in a blockchain, the method comprising the following steps:

providing a digital platform configured to coordinate and administer requests of recording information blocks in the blockchain, wherein the digital platform is configured to control all insertion of the information blocks into the blockchain and forms an interface between participants and the blockchain with all requests for storage of asset information in the blockchain passing through the digital platform and all storage of asset information in the blockchain being controlled by the digital platform, wherein the digital platform is configured for interaction and/or communication with the participants, which participants comprise a requesting entity, requesting storage of asset information in the blockchain, and/or the requesting entity, requesting storage of the asset information in the blockchain, and at least one authorized participant, wherein the digital platform is configured to define a smart-contract in the digital platform or by the digital platform and access and execute the smart contract, and an execution of the smart-contract gives rise to an insertion of information blocks in the blockchain;

acquiring the unique identifying code associated with the asset;

transmitting to the digital platform the request for storing the asset information, comprising information about the asset;

through the smart-contract defined in or by the digital platform, verifying, with the digital platform, whether storing the asset information in the blockchain requires the consent of the at least one authorized participant; wherein which participants must give consent to storage of an information block depends on the type of information to be stored and it is determined by the smart-contract, which must be executed to generate the respective information block;

through the digital platform, sending to the at least one authorized participant a request for consent to store the information; and when the consent of the at least one authorized participant is received by the digital platform, through said digital platform storing in the blockchain an information block containing the combination of the asset information, comprising information about the asset, with the unique identifying code of the asset.

2. The method of claim 1, wherein the unique identifying code is selected from the group comprising: a barcode, a QR code, a code of optically readable characters, a code stored in an electronic apparatus.

3. The method of claim 1, wherein the step of acquiring the unique identifying code comprises the step of acquiring said unique identifying code through an electronic device for reading the unique identifying code by at least one of the authorized participants, whose consent is required to store the information in blockchain.

4. The method of claim 3, wherein the device for reading the unique identifying code is selected from the group comprising: a barcode reader, a smart-device, a tablet or another mobile device, a transceiver.

5. The method of claim 1, wherein the unique identifying code is applied to the asset, in a non-removable manner.

6. The method of claim 1, wherein the unique identifying code is stored in an electronic apparatus associated with the asset.

7. The method of claim 6, wherein the electronic apparatus is a passive electronic apparatus.

8. The method of claim 6, wherein the electronic apparatus is an electronic apparatus provided with at least two different antennas, for interaction with mutually different external reading/writing apparatuses.

9. The method of claim 1, wherein the information concerning the asset is selected from the group comprising: a data item concerning at least one characteristic of at least one component of the asset; a data item concerning the owner of the asset; a data item concerning an operation carried out on the asset; a data item concerning a transfer of ownership of the asset; a data item concerning the replacement of the unique identifying code associated with the asset; a data item concerning an event that involved the asset; a data item concerning a file containing a hash or a digest of a file stored externally to the blockchain and containing information related to the asset; a multimedia file containing audio and/or video and/or images related to the asset; a digest or a hash of a multimedia file concerning the asset; a data item concerning an anomaly noted on the asset; a data item concerning a replacement of a component of the asset, associated with an identifying code of the component; a data item concerning a utilization of the asset; a combination of a plurality of said data.

10. The method according to claim 1, further comprising the following steps:

an enrollment of a new user on the digital platform, or a login of an already enrolled user, the enrolled user being identified by a unique user code;

a request to purchase an asset from the user, said purchase request being sent to an authorized dealer, associated with the digital platform; and a recording of the asset by the dealer on the digital platform, said asset becoming associated with the user.

11. The method of claim 10, further comprising the step of notifying the user of the completed purchase of the asset.

12. The method of claim 10, further comprising the step of adding to the blockchain a block containing information about the asset and the user who purchased the asset.

13. The method of claim 1, wherein the information concerning the asset is classified as personal information of a user, non-transferable, or as information transferable together with the asset.

14. The method according to claim 1, comprising the step of storing at least one multimedia file associated with the asset.

15. The method of claim 14, wherein the multimedia file is stored separately from said blockchain, and wherein an information block adapted to guarantee the inalterability of the multimedia file, comprising a hash or a digest of the multimedia file, is stored in the blockchain.

16. The method of claim 14, further comprising the steps of:

requesting access to the multimedia file by a user;

verifying whether the user is entitled to access the multimedia file according to credentials associated with the user; and if the user is entitled to access the multimedia file, transferring the multimedia file to the user.

17. The method of claim 1, wherein the asset contains at least one component, i.e. a sub-asset; each component or sub-asset is distinguished by a unique component or sub-asset identifying code, which becomes part of a block of information associable to the asset; thus allowing to have a complete traceability of an asset and to store in said blockchain all the information related to the individual components or sub-assets that constitute the asset itself, or at least to some of them.

18. A method for associating information with an asset and storing said information in information blocks in a blockchain, the method comprising the steps of:

providing a digital platform configured to coordinate and administer requests of recording information blocks in the blockchain, wherein the digital platform is configured to control all insertion of the information blocks into the blockchain and forms an interface between participants and the blockchain with all requests for storage of asset information in the blockchain passing trough the digital platform and all storage of asset information in the blockchain being controlled by the digital platform, wherein the digital platform is configured for interaction and/or communication with the participants, which participants comprise a requesting entity, requesting storage of asset information in the blockchain, and at least one authorized participant, wherein the digital platform is configured to define a smart-contract in the digital platform or by the digital platform and access and execute the smart contract, and wherein an execution of the smart-contract gives rise to an insertion of information blocks in the blockchain;

associating a unique identifying code with the asset, wherein the unique code is linked to the smart contract;

acquiring the unique identifying code associated with the asset;

transmitting from the requesting entity to the digital platform the request for storing the asset information, comprising information about the asset;

through the smart-contract defined in or by the digital platform, verifying, with the digital platform, the at least one authorized participant, whose consent is required by the smart-contract, wherein the authorized participant that must give consent as to a storage of an information block depends on the type of information to be stored and is determined by the smart-contract, which must be executed to generate the respective information block;

through the digital platform, sending to the at least one authorized participant a request for consent to store the information; and when the consent of the at least one authorized participant is received by the digital platform, through said digital platform storing in the blockchain an information block containing the combination of the asset information, comprising information about the asset, with the unique identifying code of the asset.

19. The method of claim 18, wherein the digital platform assigns the unique code to the asset, in a non-removable manner.

* * * * *